(12) United States Patent
Kubota et al.

(10) Patent No.: US 8,043,508 B2
(45) Date of Patent: Oct. 25, 2011

(54) METHOD FOR PURIFYING SUSPENDED WATER BY MEMBRANE FILTRATION

(75) Inventors: Noboru Kubota, Moriyama (JP); Takashi Ikemoto, Moriyama (JP); Hiroshi Hatayama, Moriyama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 344 days.

(21) Appl. No.: 10/181,355

(22) PCT Filed: Jan. 17, 2001

(86) PCT No.: PCT/JP01/00263
§ 371 (c)(1),
(2), (4) Date: Jul. 17, 2002

(87) PCT Pub. No.: WO01/53213
PCT Pub. Date: Jul. 26, 2001

(65) Prior Publication Data
US 2003/0111416 A1    Jun. 19, 2003

(30) Foreign Application Priority Data
Jan. 18, 2000 (JP) ................................. 2000-008622

(51) Int. Cl.
*B01D 63/02* (2006.01)
*B01D 69/08* (2006.01)
*B01D 61/14* (2006.01)

(52) U.S. Cl. .............. 210/650; 210/500.23; 210/500.36; 210/321.89

(58) Field of Classification Search .................. 210/650, 210/652, 500.22, 500.23, 500.36
See application file for complete search history.

(56) References Cited

U.S. PATENT DOCUMENTS
5,022,990 A * 6/1991 Doi et al. ................. 210/500.42
5,049,276 A 9/1991 Sasaki
6,331,248 B1 * 12/2001 Taniguchi et al. ......... 210/321.8

FOREIGN PATENT DOCUMENTS
EP 0 342 026 A2 11/1989
EP 0 923 984 A1 6/1999
JP 2-251233 A 10/1990
JP 3-288533 A 12/1991
JP 11-138164 A 5/1999

OTHER PUBLICATIONS
English Abstract of JP-03-215535, Sep. 20, 1991.*
Watanabe et al., Membrane. vol. 24, No. 6, pp. 310-318 (1999) w/ Abstract.
Standard Test Methods for Pore Size Characteristics of Membrane Filters by Bubble Point and Mean Flow Pore Test according to ASTM F316-86 (6 pages).

* cited by examiner

*Primary Examiner* — Krishnan S Menon
(74) *Attorney, Agent, or Firm* — Birch, Stewart, Kolasch & Birch, LLP

(57) ABSTRACT

A method for membrane filtration purification of suspended water, comprising filtering the suspended water under an external pressure through a porous hollow fiber membrane comprising a polyolefin, a copolymer of olefin and halogenated olefin, halogenated polyolefin or a mixture thereof and having an open area ratio in an outer surface of not less than 20% and a pore diameter in a minimum pore diameter layer of not smaller than 0.03 μm and not larger than 1 μm.

5 Claims, 28 Drawing Sheets

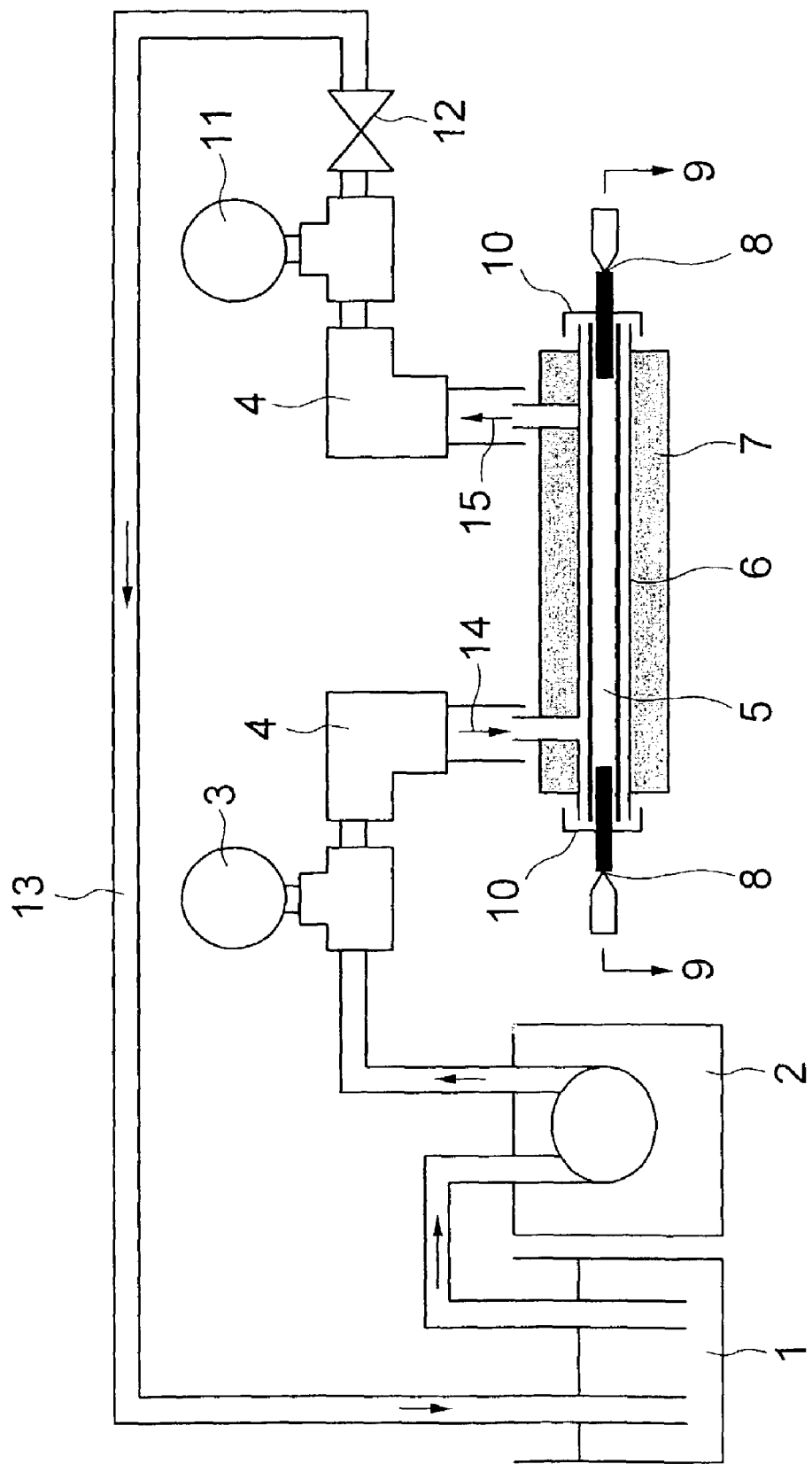

METHOD FOR PURIFYING SUSPENDED WATER BY MEMBRANE FILTRATION

This application is the national phase under 35 U.S.C. §371 of PCT International Application No. PCT/JP01/00263 which has an International filing date of Jan. 17, 2001, which designated the United States of America.

TECHNICAL FIELD

The present invention relates to a clarification method to obtain clear water usable as drinking water, industrial water or the like from natural water such as river water, lake and marsh water and underground water as well as suspended water obtained by treating natural water, and to provide regenerated water for miscellaneous uses or the like, or clean water dischargeable into the environment from domestic wastewater such as sewage water and from suspended water obtained by treating domestic wastewater.

BACKGROUND ART

A procedure of solid-liquid separation (clarification process) to remove suspended substances is indispensable for clear water treatment to obtain drinking water or to obtain industrial water from natural water sources such as river water, lake and marsh water and underground water, and for sewage water treatment to obtain regenerated water for miscellaneous uses or to obtain dischargeable clean water by treating domestic wastewater such as sewage water. There is a major need for clarification procedure to remove suspended substances (such as clay, colloid and bacteria) derived from water from natural water sources in the case of a clear water treatment, and to remove suspended substances in sewage water or suspended substances (such as sludge) in biologically treated (secondary treated) water with activated sludge and the like in the case of a sewage water treatment. Conventionally, sedimentation method, sand filtration method, and coagulation sedimentation plus sand filtration method have been predominantly used for these clarification processes, but recently a membrane filtration method has become most common. Merits of the membrane filtration method include: (1) clarification level in resultant water quality is higher and stable (enhanced safety of resultant water), (2) installation space for filter unit is small, and (3) an automated operation is easier, etc. For example, in a clear water treatment, a membrane filtration method is employed as a substitute for coagulation sedimentation plus sand filtration or as a means to further improve the water quality of treated water which has undergone coagulation sedimentation plus sand filtration by arranging it after the coagulation sedimentation plus sand filtration. In the case of a sewage water treatment, studies regarding the use of the membrane filtration method for, for example, sludge separation from secondary treated water of sewage water etc., are also in progress.

In these clarifying procedures by membrane filtration, a hollow fiber-like ultrafiltration membrane or microfiltration membrane (with pore diameters in the range from several nm to several hundred nm) is mainly used. Filtration systems using a hollow fiber-like filtration membrane include two types, an internal pressure filtration where water is filtered from inner surface side toward outer surface side of the membrane and an external pressure filtration where water is filtered from outer surface side toward inner surface side of the membrane. The external pressure filtration is, however, advantageous because it enables membrane surface area on the side in contact with raw suspended water to be larger, so that load of suspended substances per unit area of membrane surface can be less.

Clarification by a membrane filtration method is prevailing in the clear water treatment and the sewage water treatment as an alternative or a complementary technique for conventional ones due to the above described many advantages which a conventional sedimentation or sand filtration method does not have. However, wider spread of a membrane filtration method is hindered because a technology enabling a long-term stable operation of membrane filtration has not been established (see, Y. Watanabe, R. Bian, Membrane, 24(6), 310-318 (1999)). The most common hinderance to a stable operation of membrane filtration is the deterioration of the permeability of a membrane. The first cause of the deterioration of permeability is clogging of a membrane by suspended substances and the like (fouling) (see, Y. Watanabe, R. Bian, Membrane, 24(6), 310-318 (1999)). In addition, a membrane surface may be abraded by suspended substances to cause the deterioration of permeability.

SUMMARY OF THE INVENTION

An object of the present invention is to provide a clarification method comprising a membrane filtration process for clarifying natural water, domestic wastewater and suspended water, which is treated water thereof, said process is lowered in deterioration of permeability due to fouling of membrane and in deterioration of permeability due to abrasion on membrane surface and is superior in filtration stability.

The present inventors, having made extensive efforts to solve the above described problems, found out that the use of a membrane with high open area ratio in an outer surface could reduce the deterioration of permeability due to fouling and the deterioration of permeability due to abrasion on a membrane surface and enhance filtration stability of the membrane, and thus accomplished the present invention.

A core part of the present invention is to use a membrane having an outer surface with high open area ratio for filtration. It has not been known conventionally to use a membrane with high open area ratio in an outer surface in order to suppress the deterioration of permeability due to fouling or due to abrasion in membrane surface.

The deterioration of permeability due to fouling has been generally considered so far to be associated with levels of pure water flux, porosity and further pore diameters, which are fundamental properties of membrane. However, the present inventors have found out that, as described practically in Examples later, within a certain range of pore diameter, retention of permeability (degree of deterioration of permeability; the lower the retention of permeability is, the severer the deterioration is), in filtration of suspended water, has no relation to levels of pure water flux, porosities and pore diameter but is determined by the degree of open area ratio in an outer surface. That is, the present inventors have found that the larger the open area ratio in an outer surface is, the larger the retention of permeability is. This means that even the membranes having the same pure water flux, porosities and pore diameters, may have different retentions of permeability (degree of deterioration of permeability), if they have different open area ratios in their outer surfaces, and thus shows an importance of an open area ratio in an outer surface for suppression of deterioration of permeability due to fouling.

Abrasion on membrane surface has been considered to occur not during filtering operation but mainly during the process of removing suspended substances accumulated on the outer membrane surface in external pressure type filtration by air cleaning etc. However, the phenomenon itself has not been well known and thus there has been little development in technology addressing the deterioration of permeability due to abrasion on membrane surface. There has only been made mention that using a membrane having high breaking strength is effective (see JP-A-1999-138164). The present inventors have obtained knowledge that use of a membrane with high open area ratio in an outer surface is also advantageous against the deterioration of permeability due to abrasion on membrane surface. The present invention has been accomplished based on this knowledge as a core concept.

Namely, the present invention relates to:

(1) A method for membrane filtration purification of suspended water comprising filtering the suspended water under an external pressure through a porous hollow fiber membrane comprising polyolefin, a copolymer of olefin and halogenated olefin, a halogenated polyolefin or a mixture thereof and having an open area ratio in an outer surface of not less than 20% and a pore diameter in a minimum pore diameter layer of not smaller than 0.03 μm and not larger than 1 μm.

(2) the method in accordance with the above described (1), wherein the open area ratio in the outer surface of said porous hollow fiber membrane is not less than 23%.

(3) the method in accordance with the above described (1), wherein the open area ratio in the outer surface of said porous hollow fiber membrane is not less than 25%.

(4) the method in accordance with any one of the above described (1), (2) or (3), wherein said porous hollow fiber membrane has the pore diameter in minimum pore diameter layer of not larger than 0.6 μm and at least a pore diameter of an inner surface between pore diameters of the inner and outer surfaces is not smaller than 0.8 μm.

(5) the method in accordance with any one of the above described (1), (2), (3) or (4), wherein the porous hollow fiber membrane has the inner diameter of not smaller than 0.5 mm and not larger than 3 mm and the membrane thickness of not thinner than 0.1 mm and not thicker than 1 mm.

BRIEF DESCRIPTION OF THE DRAWINGS

FIG. 1 shows a schematic diagram of equipment for filtration through a hollow fiber membrane in an external pressure system, wherein, 1 is raw water; 2 is peristaltic pump; 3 is pressure gauge (inlet pressure); 4 is connector; 5 is hollow fiber membrane; 6 is tube (inner diameter of 3 mm); 7 is epoxy resin; 8 is injection needle; 9 is permeated water; 10 is silicon cap; 11 is pressure gauge (exit pressure); 12 is valve; 13 is silicon tube; 14 is feed water; and 15 is circulating water.

DETAILED DESCRIPTION OF THE INVENTION

Figure 2A:
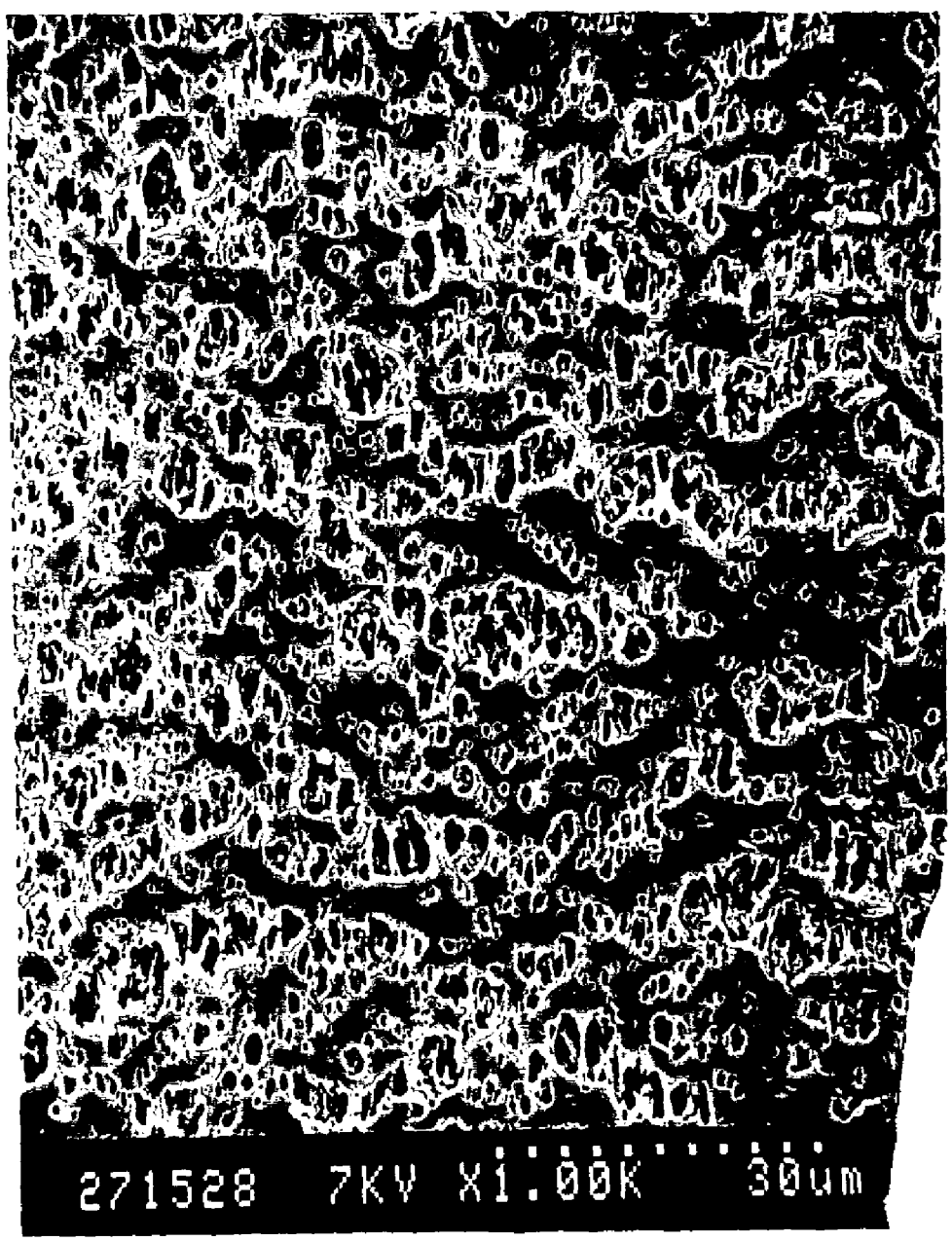
FIGS. 2A-E are electron micrographs of the porous hollow fiber membrane prepared in Example 1, and their images after black and white binarize process of a part of the photographs (black part expresses a pore section and the white part expresses a non-pore section), wherein, A is a photograph of outer surface; B is a photograph of membrane cross-section (whole view); C is a photograph of membrane cross-section (magnified view); D is a photograph of inner surface; and E is a black and white binarized image of the photograph of outer surface.
Figure 2B:
Figure 2C:
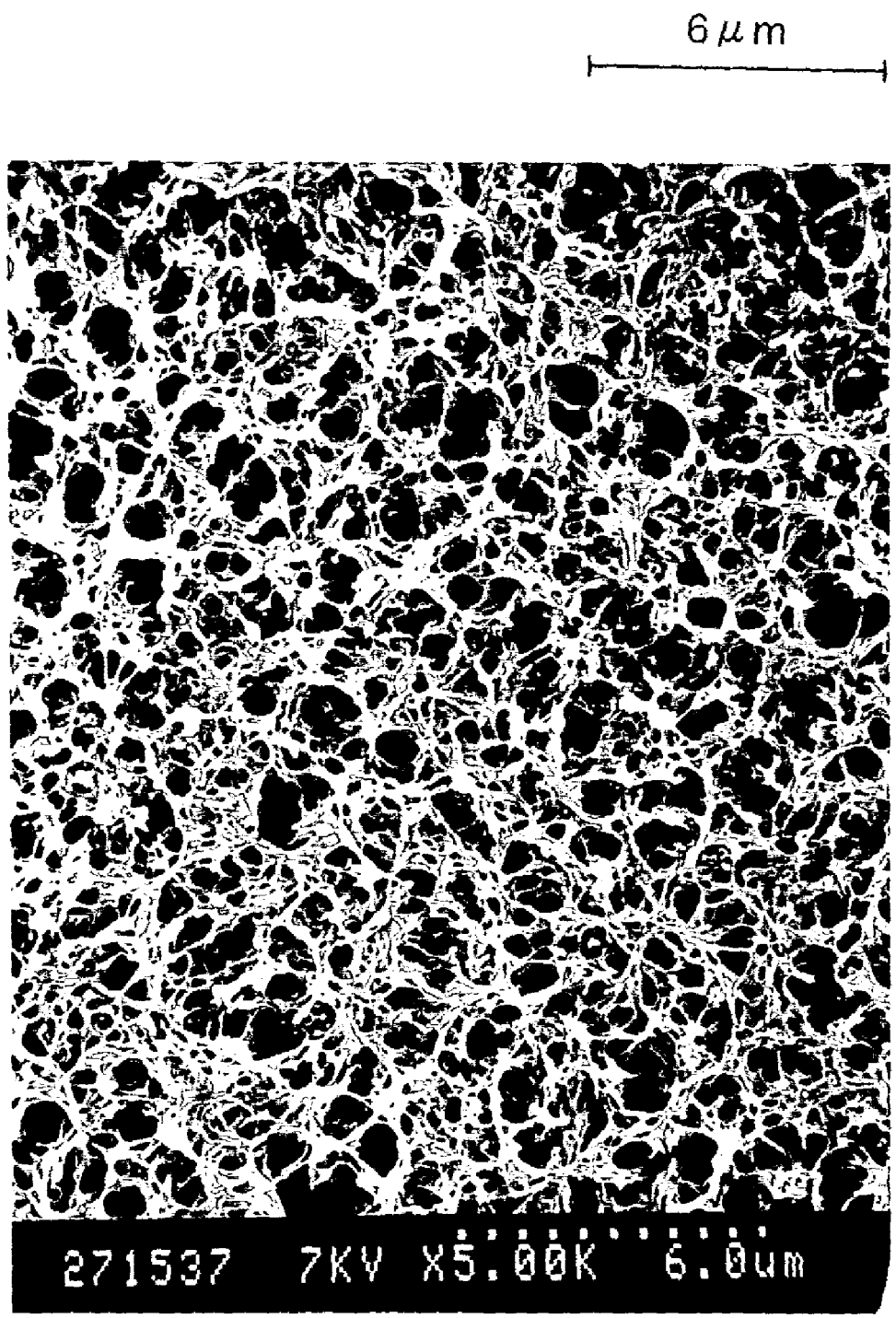
Figure 2D:
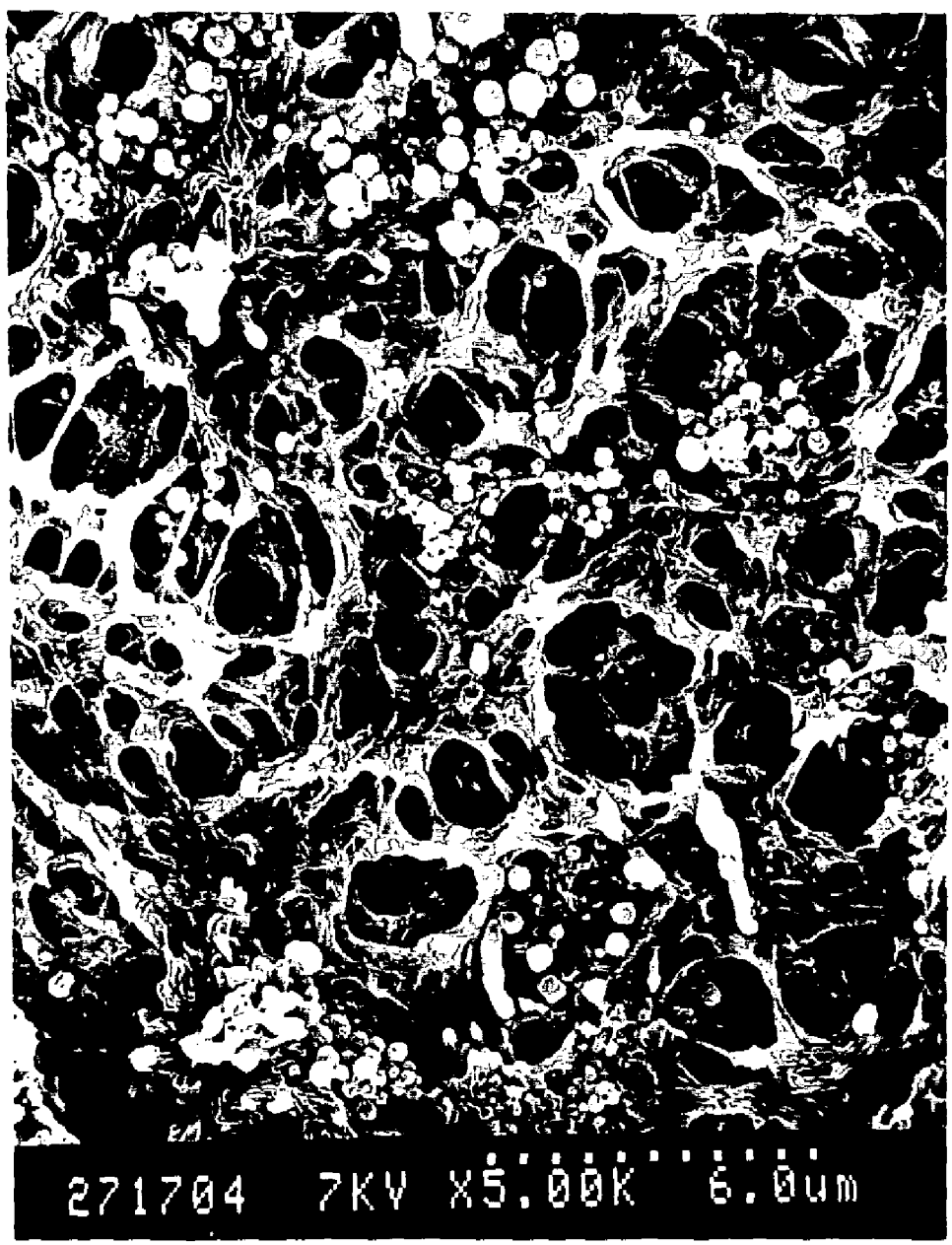
Figure 2E:
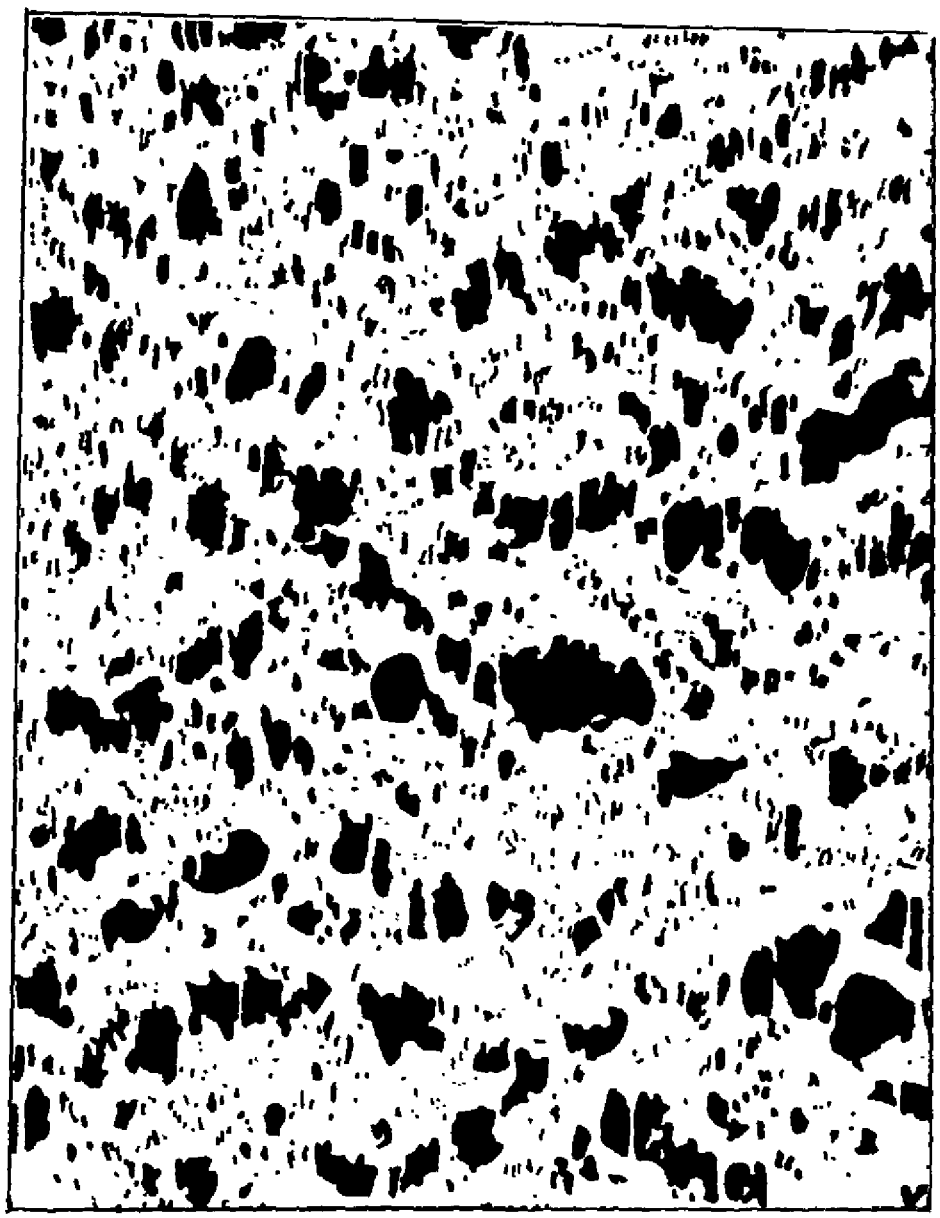

Suspended water as a target of the present invention includes natural water, domestic wastewater and treated water thereof. Natural water includes river water, lake and marsh water, underground water and sea water. Treated water of natural water, having been subjected to sedimentation treatment, sand filtration treatment, coagulation sedimentation plus sand filtration treatment, ozone treatment and the like is also included in the suspended water as a target water of the present invention. An example of domestic wastewater is sewage water. A primary treated water of sewage water having been subjected to screening filtration or sedimentation treatment, a secondary treated water of sewage water having been subjected to bioprocess treatment and further a tertiary treated (highly treated) water of sewage water having been subjected to coagulation sedimentation plus sand filtration treatment, activated carbon treatment or ozone treatment are also included in the suspended water as a target of the present invention. Suspended substances consisting of fine organic materials, inorganic materials and mixtures thereof, with a size of not larger than μm order (such as humus colloid, organic colloid, clay and bacteria) are contained in these suspended water. A method in accordance with the present invention is suitable to clarify these suspended waters.

Water quality of the above described natural water, domestic wastewater and treated water thereof as a target of clarification of the present invention can generally be expressed by typical indices, turbidity and concentration of organic materials, either alone or in combination thereof. Water quality is roughly classified by turbidity (not an instantaneous value but an average value) into low turbidity water with a turbidity of less than 1, medium turbidity water with a turbidity of not less than 1 but less than 10, high turbidity water with a turbidity of not less than 10 but less than 50 and ultra-high turbidity water with a turbidity of not less than 50. Water quality is also roughly classified by concentration of organic materials (Total Organic Carbon (TOC): mg/L) (also not an instantaneous value but an average value) into low TOC water with a TOC of less than 1, medium TOC water with a TOC of not less than 1 but less than 4, high TOC water with a TOC of not less than 4 but less than 8 and ultra-high TOC water with a TOC of not less than 8. Basically, water with higher turbidity or TOC are more likely to plug filtration membrane and thus the effects of the present invention become greater for the water with higher turbidity or TOC. However, for water with extremely high turbidity or TOC, the effects of the present invention become less noticeable because a gel layer derived from suspended substances, which are blocked and accumulated on filter surface (outer surface in the case of the present invention) of filtration membrane, becomes a controlling factor of filtration resistance.

The material used in the porous hollow fiber membrane of the present invention includes a polyolefin, a copolymer of olefin and halogenated olefin, a halogenated polyolefin or a mixture thereof. Examples are polyethylene, polypropylene, polyvinyl alcohol, ethylene-vinyl alcohol copolymer, ethylene-tetrafluoroethylene copolymer, polyvinylidenefluoride and a mixture thereof. These materials are superior as a membrane material because they are easy to handle due to being thermoplastic and have sufficient toughness. Among others, polyethylene, polypropylene, polyvinylidenefluoride and a mixture thereof are preferable due to having superior water resistance (mechanical strength in wet state), mechanical strength and chemical strength (chemical resistance) due to their hydrophobic property and high crystallinity, as well as good moldability. In particular, polyethylene, polypropylene and a mixture thereof are more suitable as a membrane material because not only do they have particularly good moldability but they also are easy in waste treatment due to their halogen-free composition and low cost.

The open area ratio in the outer surface of the porous hollow fiber membrane used in the present invention is not less than 20%, preferably not less than 23%. By using a membrane with a high open area ratio in the outer surface in filtration, deterioration of permeability due to both fouling and abrasion on membrane surface can be reduced and filtration stability can be enhanced. In particular, since the effect of suppressing deterioration of permeability due to abrasion on membrane surface becomes significant when the open area ratio in outer surface is not less than 25%, open area ratio in outer surface of not less than 25% is particularly preferable. In a case where a halogenated polyolefin such as polyvinylidenefluoride is used, the effect of making open area ratio in the outer surface of not less than 25% is particularly great. However, if open area ratio in outer surface is too high, the mechanical strength of the membrane becomes too low, which is not preferred, and thus the open area ratio in the outer surface is preferably less than 50%, particularly preferably less than 40% and more preferably less than 30%.

The open area ratio in the outer surface is determined by subjecting an electron micrograph of outer surface to a black and white binarize process to identify pore sections and non-pore sections present in the outer surface and using the formula:

Open area ratio [%]=100×(area of pore section)/{(area of pore section)+(area of non-pore section)}

The magnification of the electron micrograph should be large enough so as to allow shapes of pores present in outer surface to be clearly recognized. However, an area to be photographed should be as large as possible to measure the open area ratio as accurately as possible, and thus a too high magnification is not suitable. A guideline for the magnification of photograph is 1,000-5,000 times when areal nucleus of pore diameter in outer surface (pore diameter corresponding to a cumulative area of 50%) is about 1-10 μm, 5,000-20,000 times when it is about 0.1-1 μm and 10,000-50,000 times when it is about 0.03-0.1 μm. Upon black and white binarizing, electron micrographs taken by these magnifications may be used after enlarging by means of copier and the like.

In this connection, by using a commercially vailable image analysis system, black and white binarize process can be performed in an apparatus of the system directly from an electron micrograph or its duplicate. However, this method is not suitable because it tends to induce an error in measuring open area ratio caused by an incorrect recognition in the binarize process due to the following reasons: in a general electron micrograph the edge of peripheral part of pore may shine whitely or a non-pore part becomes black as pore part does, depending on the way contrast is used in photographing. Furthermore, the direct black and white binarize process using an electron micrograph or its duplicate in the system apparatus, may wrongly recognize an inner structure, which is in fact not a surface region but is viewable from opening section of surface, as a structure of a surface region to induce an error in measuring open area ratio.

Therefore, when the open area ratio is determined by a black and white binarize process, it is convenient to place a transparent sheet on an electron micrograph or its copy, mark (transcript) the pore section present on the surface with black ink of a black felt tip pen or the like, then photocopy this transcribed sheet on a white paper to clearly distinguish pore sections as black and non-pore sections as white, and make a measurement of open area ratio using a commercially available image analysis system and the like.

A pore diameter in minimum pore diameter layer of the porous hollow fiber membrane used in the present invention is not smaller than 0.03 μm and not larger than 1 μm. Minimum pore diameter layer means a layer having the most dense pores (small pore diameter) in a membrane cross-section, which determines clarification performance for suspended substances and affects an initial permeability (or pure water permeability) greatly. Pore diameter in a minimum pore diameter layer is an averaged pore diameter of pores present in said layer. A pore diameter in minimum pore diameter layer smaller than 0.03 μm is not suitable because an initial permeability is too low. A pore diameter over 1 μm is not suitable because clarification performance for suspended substances to be removed lowers. A pore diameter in minimum pore diameter layer is preferably not smaller than 0.05 μm and not larger than 0.6 μm, more preferably not smaller than 0.1 μm and not larger than 0.4 μm. Pore diameter in a minimum pore diameter layer can be measured in accordance with ASTM: F316-86, a method for measuring mean flow pore size (half-dry method in another name). Mean flow pore size measured by half-dry method is a flow averaged pore diameter in minimum pore diameter layer. In the present invention, therefore, said flow averaged pore diameter measured by half-dry method is used as pore diameter in a layer with minimum pore diameter. In the present invention a measurement by half-dry method is carried out using ethanol as a liquid for hollow fiber membrane with length of about 10 cm and a measurement at 25° C. with pressure increasing rate of 0.01 atm/sec is used as standard measurement conditions. A pore diameter in minimum pore diameter layer (flow averaged pore diameter by half-dry method) is determined by the following equation:

Pore diameter in minimum pore diameter layer [μm]= 2860×(surface tension of liquid in use [dynes/cm])/(half-dry air pressure [Pa])

Since surface tension of ethanol at 25° C. is 21.97 dynes/cm (see Handbook of Chemistry, edited by Chemical Society of Japan, Fundamental Section, Revision 3, II-82 p, Maruzen, 1984), the pore diameter in minimum pore diameter layer can be determined by the following equation, under the standard measurement conditions of the present invention:

Pore diameter in minimum pore diameter layer [μm]= 62834/(half-dry air pressure [Pa])

A preferable cross-sectional structure of porous hollow fiber membrane used in the present invention is a sponge structure with 3-dimensional network. A non-3-dimensional network structure, that is, a structure with linear through holes in thickness direction, or a non-sponge structure, that is, a structure where such a macro-void, that may occupy not less than ¼ of thickness is substantially present (so-called void structure) in membrane cross-section, generally gives a porous membrane with small specific surface area and thus small specific surface area per suspended substance load. On the other hand, a sponge structure with 3-dimensional network generally provides a porous membrane with large specific surface area, and thus large specific surface area per suspended substance load, and results in enhanced ability for suspended matter load in a membrane cross-section, contributing to an improvement of filtration stability. Furthermore, a sponge structure with 3-dimensional network is preferred to a void structure since the 3-dimensional network has a higher compressive strength than a void structure.

A suitable manufacturing method for a sponge structure with 3-dimensional network suitably used in the present invention includes a thermally induced phase separation method. The thermally induced phase separation method is a method wherein a thermoplastic polymer and a latent solvent for the thermoplastic polymer, which is a non-solvent at around room temperature but is a solvent at a high temperature for the thermoplastic polymer, are heated and mixed to a molten state at a high temperature (not lower than the temperature at which both of them are mutually solved). The mixture is then cooled down to a temperature not higher than the solidification temperature of the thermoplastic polymer, inducing a phase separation between a polymer rich phase and a polymer lean (solvent rich) phase by utilizing lowering of solubility of the thermoplastic polymer to the latent solvent during said cooling process. Subsequently the latent solvent is removed by extraction to give a porous body consisting of solidified body of the polymer rich phase generated in the phase separation (see H. Matsuyama, Chemical Engineering, 43(1998) 453-464 or D. R. Lloyd, et. al., Journal of Membrane Science, 64 (1991) 1-11, etc). In this connection, the thermally induced phase separation method also includes a method comprising adding inorganic filler such as pulverized silica particles to the mixture in addition to a thermoplastic polymer and its latent solvent. The mixture is heated and mixed and after cooling for solidification, the inorganic fillers are extracted together with the latent solvent to obtain a porous body. Examples of latent solvents, when a thermoplastic polymer is, for example, polypropylene and polyvinylidenefluoride, include phthalates such as dibutyl phthalate, dihexyl phthalate, dioctyl phthalate, di(2-ethylhexyl) phthalate and diisodecyl phthalate and a mixture thereof.

One of the suitable methods for obtaining porous hollow fiber membrane using a thermally induced phase separation method is as follows: A thermoplastic polymer as a membrane polymer material and its latent solvent (optionally with an inorganic filler) are heated and mixed to a melt using an extruder and the like, followed by extruding said molten mixture through a spinneret (a nozzle having a circular ring hole to extrude heated mixture in its extrusion face and a round hole to inject a hollow part forming fluid inside the circular ring hole) in a hollow shape with injection of hollow part forming fluid into the hollow part, cooling to solidify, and then removing by extraction the latent solvent (and an inorganic filler). The hollow part forming fluid is injected into said hollow part so that hollow part of a hollow fiber-like extrudate does not collapse during cooling and solidifying, and gas or liquid that is substantially inactive (without inducing any chemical change) to the molten extrudate is used as a hollow part forming fluid. Cooling and solidifying after extrusion can be performed by air cooling, liquid cooling or the combination thereof. Gas or liquid as a cooling medium is required to be substantially inactive to the extrudate. Extraction of a latent solvent (or an inorganic filler) is performed using a volatile liquid or an aqueous solution that is substantially inert to the materials solidified by cooling and superior in dissolving power for the latent solvent (or inorganic filler).

An example of a suitable method for manufacturing porous hollow fiber membrane having a sponge structure with 3-dimensional network suitably used in the present invention includes the following three types, (A)-(C), using a thermally induced phase separation method and a combination thereof. (A) A method comprising heating and mixing an inorganic filler along with an membrane polymer material and its latent solvent, and after cooling and solidifying, removing by extraction the inorganic filler together with the latent solvent. Preferable inorganic fillers are pulverized silica having an average primary particle diameter of not smaller than 0.005 μm and not larger than 0.5 μm and a specific surface area of not less than 30 m$^2$/g and not larger than 500 m$^2$/g. Since such pulverized silica has good dispersibility during heated mixing, the resultant membrane tends to have less structural defects and removal by extraction can be easily performed with an alkaline aqueous solution. Preferable amounts of a membrane material polymer in the heated mixing is, in view of a balance between strength and opening characteristics of the resultant membrane, from 15% by weight to 25% by weight for materials with a specific gravity of about 1 g/cm$^3$, such as polyethylene and polypropylene, and from 25% by weight to 45% by weight for materials with a specific gravity of about 1.7 g/cm$^3$, such as polyvinylidenefluoride, which is about 1.7 times more than that of a case of material with a specific gravity of 1. Furthermore, a weight ratio of latent solvent/pulverized silica is, in view of a balance between strength and opening characteristics of resultant membrane, not less than 1.0 and not more than 2.5, in particular, preferably not less than 1.2 and not more than 1.8.

(B) A method wherein cooling and solidifying of the molten mixture extruded from a spinneret is carried out in a liquid bath composed of a latent solvent as an upper layer and water as a lower layer. This method is applicable when the latent solvent is a liquid with a specific gravity smaller than that of water and is incompatible with water, such as di(2-ethylhexyl) phthalate, dioctyl phthalate and diisodecyl phthalate. A thickness of the upper layer is, in view of ensuring opening characteristics, not less than 1 mm, preferably not less than 5 mm. On the contrary, too thick upper layer gives unfavorable effect in view of ensuring cooling ability of a liquid bath, and the thickness is not larger than 30 cm, preferably not larger than 10 cm, and more preferably not larger than 2 cm. A lower water layer should have a thickness of not less than 5 cm, preferably not less than 10 cm, in view of ensuring cooling ability. Cooling in this two layer liquid bath system is a process to ensure opening characteristics in an outer surface by passing through an upper layer consisting of a latent solvent and to ensure cooling and solidifying by passing through a lower layer consisting of water, which is superior in cooling ability due to its high heat content. In this connection, a time required for extrudate to travel from a spinneret to liquid surface of a liquid bath (aerial running time) should not be too long in order to obtain sufficient effects brought about by passing through an upper layer of a liquid bath, and is preferably not longer than 5 second, more preferably not longer than 1 second. However, a condition under which the aerial running time is zero, that is, a state in which the spinneret contacts with liquid surface of the liquid bath, is not preferable because temperatures of both the spinneret and the liquid bath cannot be controlled. By a method using this two layer liquid bath system, the opening characteristics in outer surface is effected relatively easily. When this two layers liquid bath system is used, preferable amounts of a membrane material polymer used in heated mixing is, in view of a balance between strength and opening characteristics of resultant membrane, from 15% by weight to 35% by weight for materials with a specific gravity of about 1 g/cm$^3$ such as polyethylene and polypropylene, and from 25% by weight to 60% by weight for materials with a specific gravity of about 1.7 g/cm$^3$, such as polyvinylidenefluoride which is about 1.7 times more than that of a material with a specific gravity of 1. By the way, an aerial running time is determined by the following equation based on winding speed and an aerial running distance (a distance from spinneret surface to liquid bath surface), when hollow fiber is wound up at an exit of liquid bath without tension:

Aerial running time [second]=(aerial running distance [cm])/(winding speed [cm/second])

(C) A method wherein a porous hollow fiber membrane prepared by using a thermally induced phase separation method is drawn in the longitudinal direction of the hollow fiber. Drawing is conducted after cooling and solidifying and before or after extraction of a latent solvent (and/or an inorganic filler). With regard to the extent of the extension of hollow fiber by drawing, too small of an extension results in insufficient security of opening characteristics and too large of an extension results in fracture of membrane structure. Therefore, drawing operation should be controlled preferably within a range from 10% to 100% in a residual elongation ratio. In this connection, the residual elongation ratio is defined by the following equation based on a fiber length before drawing and a fiber length after relaxation when tension is removed after drawing. By subjecting a hollow fiber membrane to drawing operation at such a low ratio (relatively low residual elongation ratio), improvement in the opening characteristics of the membranes with low opening characteristics can be achieved.

Residual elongation ratio [%]=100×[(fiber length after relaxation)−(fiber length before drawing)]/(fiber length before drawing)

With regard to a membrane structure, so-called anisotropic cross-sectional structure is particularly preferable, in which a pore diameters in other layers than a minimum pore diameter layer are significantly larger than that in the minimum pore diameter layer. However, it is not an indispensable constituent of the present invention for a membrane to have an anisotropic cross-sectional structure. In a membrane with an anisotropic cross-sectional structure (hereinafter referred to as membrane with anisotropic structure), pore diameter is not uniform (even) but varies along a cross-sectional direction of membrane (thickness direction). Initial permeability (or pure water permeability) of a membrane depends on a thickness of minimum pore diameter layer. The thicker the minimum pore diameter layer in a membrane is, the larger the permeation resistance of the whole membrane and the lower the initial permeability (or pure water permeability). In a membrane with anisotropic structure, since a minimum pore diameter layer is a part of the whole membrane thickness, it has a smaller permeation resistance than a membrane with an isotropic structure which have a minimum pore diameter layer throughout the thickness, and thus an initial membrane permeability (or pure water permeability) can be improved. Contrarily, a blocking ability for suspended substances is the same as long as a pore diameter in a minimum pore diameter layer is the same, irrespective of the thickness of the minimum pore diameter layer. Therefore, membranes with an anisotropic structure and with an isotropic structure having the same pore diameter in their minimum pore diameter layers, by comparison have the same blocking ability for suspended substances, but the former has a higher initial permeability (or pure water permeability). In a practical clarification operation, it is generally conducted by a constant filtration operation, where an amount of permeated water through membrane is kept constant in filtration. A high initial permeability (or pure water permeability) means an ability to operate filtration under a lower filtration pressure at least during an initial stage of filtration operation, and contributes to high filtration stability, that is an objective of the present invention.

From the above viewpoint, a porous hollow fiber membrane having an anisotropic structure in which at least the inner surface side has coarser pores, wherein a pore diameter in the minimum pore diameter layer is not larger than 0.6 µm to provide a sufficient ability to block suspended substances, and at least the pore diameter in the inner surface of the pore diameters in the inner and outer surfaces is not smaller than 0.8 µm, can be suitably used in the present invention. However, since too large pore diameter in an inner surface lowers the membrane strength, it is preferable to be not larger than 10 µm. Pore diameter in outer surface is not specially limited. Although an outer surface may have a larger pore diameter and less dense structure than a minimum pore diameter layer, desirably pore diameter in the outer surface is not larger than 10 µm, in view of strength.

Pore diameter in an inner surface is expressed by a pore diameter corresponding to 50% cumulative area of pores observed on the inner surface (present on an inner surface) in an image of inner surface observed by electron microscope. The "pore diameter corresponding to 50% cumulative area of pores" means, for the pores observed on the surface (present on the surface), the diameter of the pore up to which the subtotal of the pore areas reaches 50% of the total of the areas of all the pores when adding up the areas of the pores in an electromicroscopic image in order of diameter (for the smallest diameter to larger diameters or from the largest diameter to smaller diameters). As a diameter of a pore observed to be a non-circular shape (such as ellipse), a diameter of a circular shape, to which said pore is approximated, (a diameter of circle having the same area as said pore) is adopted. In this connection, the pore diameter, defined by a pore diameter corresponding to 50% cumulative area, is different in definition from mean flow pore size used in defining pore diameter of a minimum pore diameter layer, and gives smaller value than mean flow pore size. However, for measuring pore diameter in a surface, since pore diameter corresponding to 50% cumulative area is easier to measure and more accurate than mean flow pore size, inner surface pore diameter is defined by pore diameter corresponding to 50% cumulative area in the present specification.

Pore diameter in an inner surface is measured just as in measurement of open area ratio in an outer surface described above, by subjecting pore and non-pore sections present in the inner surface to a black and white binarize process in an electron micrograph of the inner surface, followed by determination of pore diameter (pore diameter of approximated circle) and pore area of each pore using a commercial image analyzing system or the like and adding up area of each pore in order of diameter, from the smallest pore to the larger pores or vice versa, in accordance with the above described definition, and thus determining the diameter of the pore up to which the subtotal of each pore area reaches 50% of the total area of all pores.

Such a porous hollow fiber membrane having an anisotropic cross-sectional structure with a nondense structure at least in an inner surface side, can be prepared by using a latent solvent as a hollow part forming fluid in the above-described example method for manufacturing porous hollow fiber membrane using a thermally induced phase separation approach.

The inner diameter of porous hollow fiber membrane used in the present invention is not smaller than 0.5 mm and not larger than 3 mm, preferably not smaller than 0.5 mm and not larger than 1.5 mm. Too small an inner diameter is disadvantageous, because it increases the resistance of liquid (pressure loss) flowing in a hollow fiber tube, and on the contrary, too large a diameter is also disadvantageous due to decrease in filled membrane area per unit volume. The thickness of porous hollow fiber membranes used in the present invention is not thinner than 0.1 mm and not thicker than 1 mm. Too thin of a membrane is disadvantageous due to its lowered membrane strength, and on the contrary, too thick of a membrane is also disadvantageous due to its strong filtration resistance. A thicker membrane also enables to provide a larger specific area per membrane surface area and increase specific area per suspended matter load and thus is preferable in view of improvement of filtration stability. Therefore, a membrane thickness of not less than 0.2 mm is particularly preferable.

EXAMPLES

Hereinbelow, examples of the present invention will be described, but the present invention is not limited to these examples.

In this connection, measurements for various property values described in these examples were conducted in accordance with the following procedures:

1) Open Area Ratio in Outer Surface and Pore Diameter in Inner Surface:

Electron micrographs taken at the magnification from 1,000 to 10,000 times were photocopied with enlargement by 2 times in length and breadth. A transparent sheet (a commercially available OHP sheet) was then placed on said enlarged copy to mark the pore sections present in the membrane surface with the black ink of a felt tip pen. Then said marked sheet was black and white photocopied on a white paper in such a way that pore sections became black and non-pore sections became white, and the black and white photocopied image was then input to a computer using a CCD camera. Area and diameter (value corresponding to approximated circle) of each pore were determined by using image analyzing software "Quantimet 500", manufactured by Leica. Open area ratio was determined by the following equation:

Open area ratio [%]=100×(sum of each pore area)/(area of analysis object)

wherein, (area of analysis object)=(sum of each pore area)+(sum of each non-pore area).

Pore diameter in the inner surface was determined by adding up the area of each pore in the inner surface in order of diameter, from the smallest pore diameters to the larger pores, and determining a pore diameter of the pore up to which the subtotal of each pore area reaches 50% of the total area of all pores.

2) Pore Diameter in a Minimum Pore Diameter Layer:

It was measured in accordance with ASTM F316-86 under the standard measurement conditions described hereinabove.

3) Pure Water Flux:

A hollow fiber membrane with a length of about 10 cm was immersed in ethanol and then several times in pure water repeatedly. Thus wet-treated hollow fiber membrane was sealed in one end, and an injection needle was inserted into a hollow section in the other end. By injecting pure water at 25° C. into a hollow part under a pressure of 0.1 MPa at 25° C. of ambient temperature, an amount of pure water permeated from outer surface was measured to determine a pure water flux by the following equation:

Pure water flux [L/m$^2$/h]=60×(amount of permeated water [L])/[π×(outer diameter of membrane [m])×(effective length of membrane [m])×(measurement time [min])]

wherein, an effective length of membrane is defined as a net membrane length excluding a portion into which an injection needle is inserted.

4) Retention of Water Permeability During Filtration of Suspended Water:

This value is an index to judge a degree of deterioration of water permeability by fouling. A hollow fiber membrane was immersed in ethanol and then several times in pure water repeatedly. Using thus wet-treated hollow fiber membrane with an effective length of 11 cm, filtration was carried out by external pressure system (FIG. 1). Pure water was filtered under the pressure to provide 10 m$^3$ of permeation per 1 m$^2$ of membrane outer surface area per day, thus permeated pure water was collected for two minutes and determined as an initial permeation amount for pure water. Then, river surface water (surface stream water of Fuji River: turbidity of 2.2, TOC concentration of 0.8 ppm), as natural suspended water, was filtered for 10 minutes under the same filtration pressure as in the measurement of initial permeation amount for pure water, and the permeated water was collected for 2 minutes from the eighth minute to the tenth minute after the filtration started, to obtain a permeation amount in filtration of the suspended water. Retention of water permeability in filtration of suspended water was defined by the equation below. All of the operations were conducted at 25° C. and a linear velocity at membrane surface of 0.5 m/sec.

> Retention of water permeability in filtration of suspended water [%]=100×(Permeation amount in filtration of suspended water [g])/(Initial permeation amount for pure water [g])

wherein,

Filtration pressure=[(Inlet pressure)+(Exit pressure)]/2

Outer surface area of membrane [m$^2$]=π×(Outer fiber diameter [m])×(Effective membrane length [m])

Linear velocity at membrane surface [m/s]=4×(Amount of circulating water [m$^3$/s])/[π×(Tube diameter [m])$^2$−π×(Outer membrane diameter [m])$^2$]

In this measurement, filtration pressure for suspended water was not constant for each membrane but set at such a pressure that an initial permeability for pure water (it is also a permeability at the start of filtration of suspended water) provides permeation of 10 m$^3$ per 1 m$^2$ of membrane outer surface area per day. This is because, in practical treatment for tap water and sewage water, the membrane is generally used in operation at a constant filtration amount (a filtration operation system where filtration pressure is adjusted so as to obtain a constant filtration amount per a given time), and therefore, in the present measurement, a comparison of the deterioration of membrane permeability can be made under conditions which resemble as close as possible to those of the operation at a constant filtration amount, within the limits of using single hollow fiber membrane.

5) Ratio of Resistance to Membrane Surface Abrasion:

This value is an index for judging degree of deterioration of permeability due to abrasion on the membrane surface. A wet-treated hollow fiber membrane obtained by immersing hollow fiber membrane in ethanol and then in pure water several times repeatedly, was placed on a metal plate. Suspended water containing 20% by weight of fine sand (particle diameter of 130 μm, Fuji Brown FRR#120) was sprayed onto the outer surface of the membrane by ejecting the suspended solution from a nozzle that is set at a position 70 cm above said membrane with a pressure of 0.07 MPa. After ten minutes of spraying, spraying for another ten minutes was repeated after turning the membrane upside down. Pure water flux was measured before and after the spraying and ratios of resistance to membrane surface abration were determined by the following equation:

> Ratio of resistance to membrane surface abrasion [%]=100×(pure water flux after spraying)/(pure water flux before spraying)

6) Porosity:

This value is an index showing pore characteristics not only for surface of the membrane but also for the whole membrane. Porosity was determined by the following equation:

> Porosity [%]=100×[(Weight of wet-treated membrane [g])−(Weight of dry membrane [g])]/(Membrane volume [cm$^3$])

wherein, wet-treated membrane means a state of membrane filled with water in pores but not filled with water in a hollow part, and practically, it was obtained as follows: Sample membrane with a length of 10-20 cm was immersed in ethanol to fill pores with ethanol, followed by immersion into water 4-5 times repeatedly to sufficiently substitute ethanol in pore with water. Then water in a hollow part was removed by swinging the hollow fiber about five times with one end of the hollow fiber gripped and further swinging about five times with another end of the hollow fiber gripped. A dry membrane was obtained by drying the above mentioned wet-treated membrane, after weight measurement, in an oven at 80° C. to have a constant weight. Membrane volume was determined by the following equation:

> Membrane volume [cm$^3$]=π×[(Outer diameter [cm]/2)$^2$−(Inner diameter [cm]/2)$^2$]×(membrane length [cm]).

When an error is large in weight measurement due to too light weight for single membrane, a plurality of membranes were used in weight measurement.

Example 1

A mixture of 20 parts by weight of high density polyethylene (SH800 from Asahi Kasei Corp.) and 80 parts by weight of diisodecyl phthalate (DIDP) was heated and mixed to a molten state (at 230° C.) in a twin screw extruder (TEM-35B-10/1V from Toshiba Machine Co., Ltd.). Then the above molten mixture was extruded through a circular ring hole for extrusion of molten material, having an outer diameter of 1.58 mm and an inner diameter of 0.83 mm, which is present in an extrusion face of a spinneret for hollow fiber formation, mounted at the extrusion exit in a head (230° C.) of the extruder tip. DIDP was discharged as a hollow part forming fluid through a round hole for injection of hollow part forming fluid, having 0.6 mm of diameter, which is present inside the circular ring hole for extrusion of molten material, and injected into a hollow part of the hollow fiber-like extrudate.

Hollow fiber-like extrudate extruded through the spinneret into air and was introduced into a liquid bath consisting of a top layer of di(2-ethylhexyl) phthalate (DOP) (1.5 cm thick; 50° C.) and a lower layer of water (50 cm thick; 30° C.), via an aerial running distance of 2.0 cm. The hollow fiber-like extrudate was, after running through DOP layer with a thickness of 1.5 cm, introduced into a water layer, and ran therethrough for a distance of about 3 m, then through DOP layer again. The extrudate was taken out from the liquid bath and wound up at a speed of 16 m/min without tension. DIDP and DOP contained in the membrane and adhered to the membrane were removed by extraction by immersing the hollow fiber-like material thus obtained in methylene chloride, then the membrane was dried at 50° C. for half a day to obtain a porous hollow fiber membrane made of polyethylene. Various property values of the resultant membrane (open area ratio in outer surface, pore diameter in minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 2A-E.

Example 2

A mixture of 20 parts by weight of high density polyethylene (Hizex Million 030S from Mitsui Chemical Co., Ltd.) and 80 parts by weight of diisodecyl phthalate (DIDP) were heated and mixed to a molten state (at 230° C.) in a twin screw extruder (TEM-35B-10/1V from Toshiba Machine Co., Ltd.). Then said molten material was extruded through a circular ring hole for extrusion of molten material, having an outer diameter of 1.58 mm and an inner diameter of 0.83 mm, which is present in an extrusion face of a spinneret for hollow fiber formation, mounted at extrusion exit in a head (230° C.) of extruder tip. DIDP was discharged as a hollow part forming fluid through a round hole for injection of hollow part forming fluid, having a diameter of 0.6 mm, which is present inside the circular ring hole for extrusion of molten material, and injected into a hollow part of hollow fiber-like extrudate.

Figure 3A:
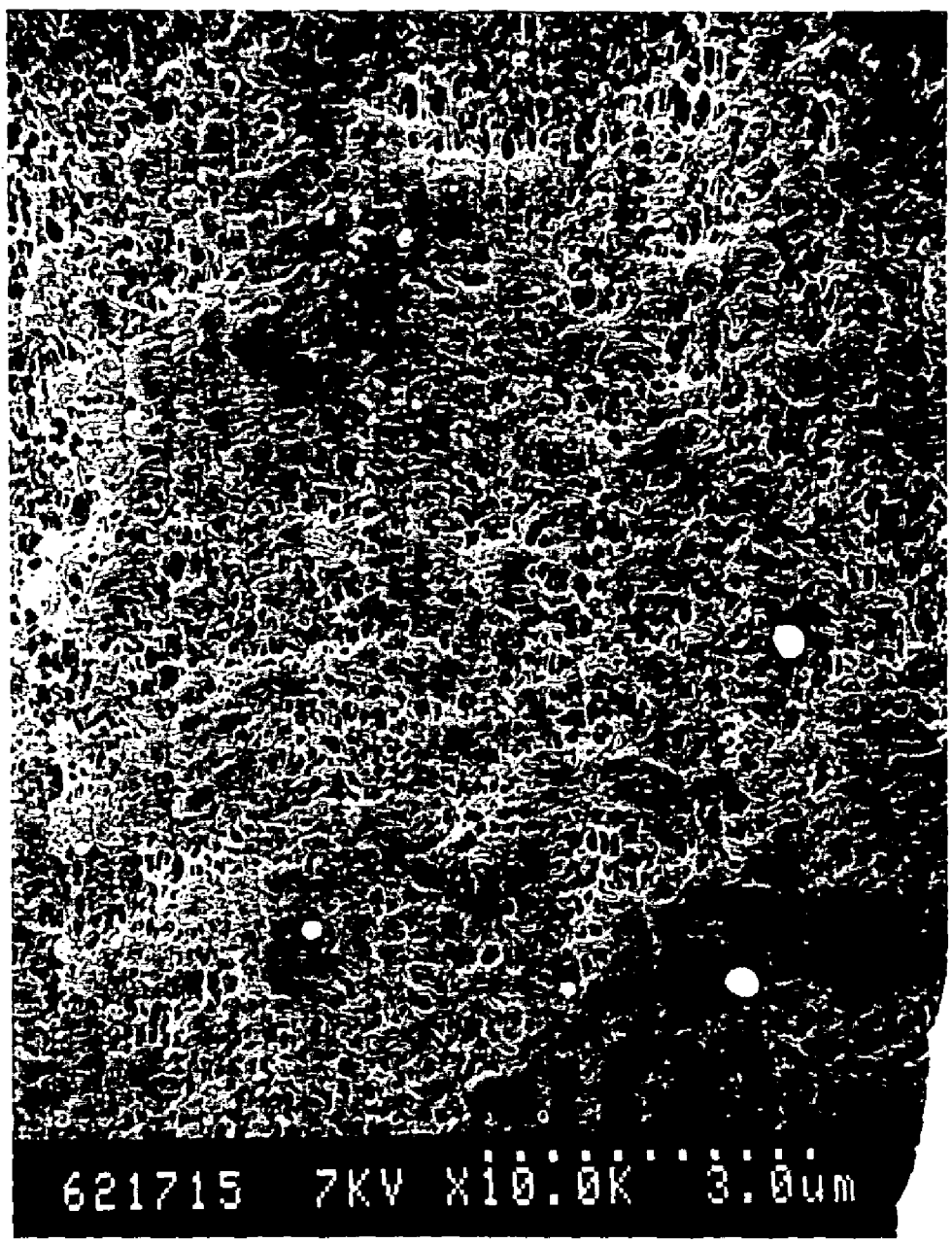
FIGS. 3A-C are electron micrographs of the porous hollow fiber membrane prepared in Example 2, and their images after black and white binarize process of a part of the photographs (black part expresses a pore section and the white part expresses a non-pore section), wherein, A is a photograph of outer surface; B is a photograph of membrane cross-section (whole view); and C is a black and white binarized image of the photograph of outer surface.
Figure 3B:
Figure 3C:

Hollow fiber-like extrudate extruded through the spinneret into air was introduced into a water bath (30° C.), via aerial running distance of 5 cm. The hollow fiber-like extrudate ran through water layer for a distance of about 3 m, then was taken out from the water bath and wound up at a speed of 16 m/min without tension. DIDP in the membrane was removed by extraction by immersing the hollow fiber-like material thus obtained in methylene chloride, and then the membrane was dried at 50° C. for half a day. A drawing procedure was applied to the resultant porous hollow fiber membrane made of polyethylene, in which the membrane with an original length of 20 cm was stretched up to 40 cm at 25° C. under a tension, then the tension was removed. The fiber length after releasing tension was 28 cm. Various property values of the resultant membrane (open area ratio in outer surface, pore diameter in minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 3A-C.

Example 3

Figure 4A:
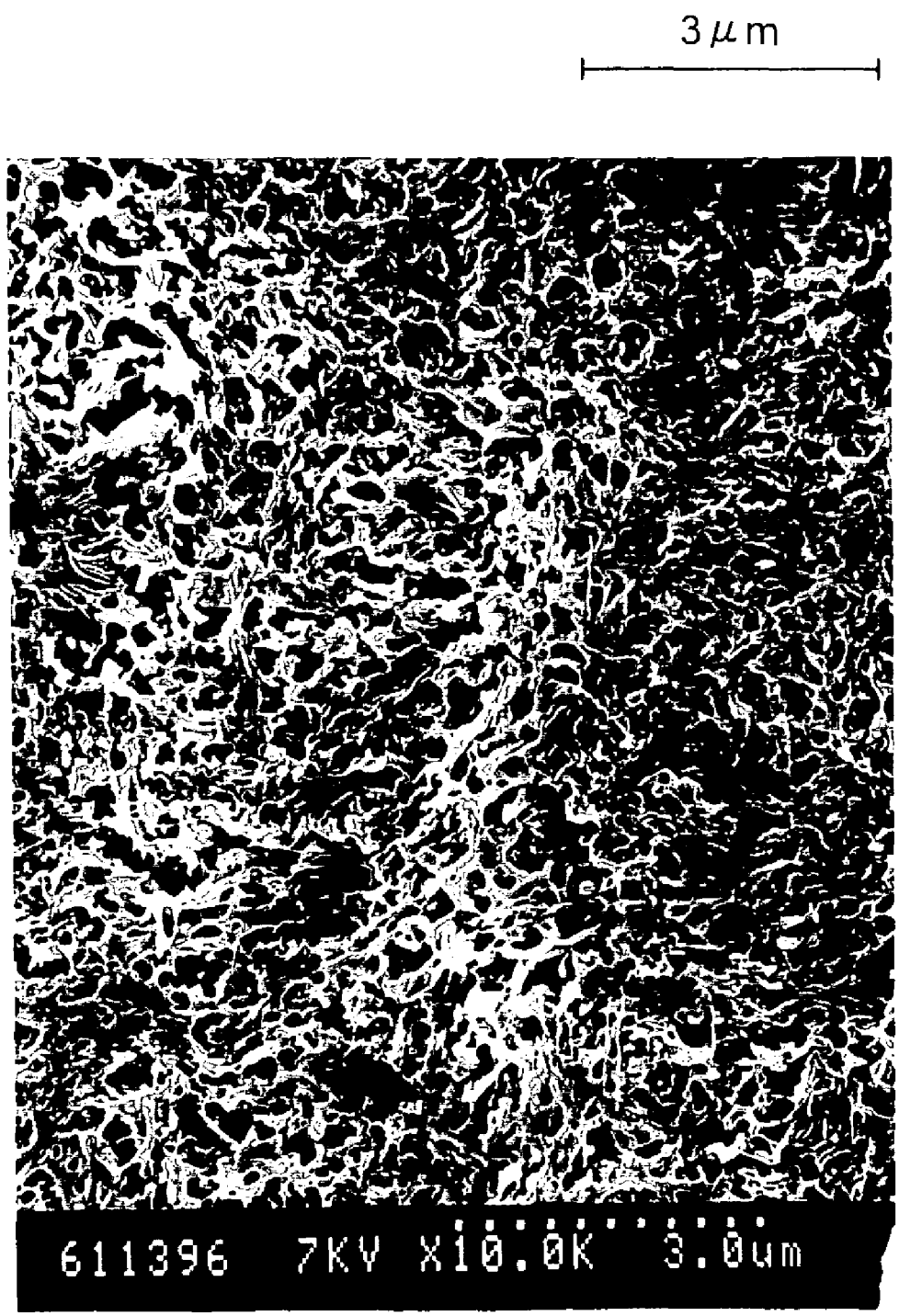
FIGS. 4A-C are electron micrographs of porous hollow fiber membrane prepared in Example 3, and their images after black and white binarize process of a part of the photographs (black part expresses a pore section and the white part expresses a non-pore section), wherein, A is a photograph of outer surface; B is a photograph of membrane cross-section (whole view); and C is a black and white binarized image of the photograph of outer surface.
Figure 4B:
Figure 4C:
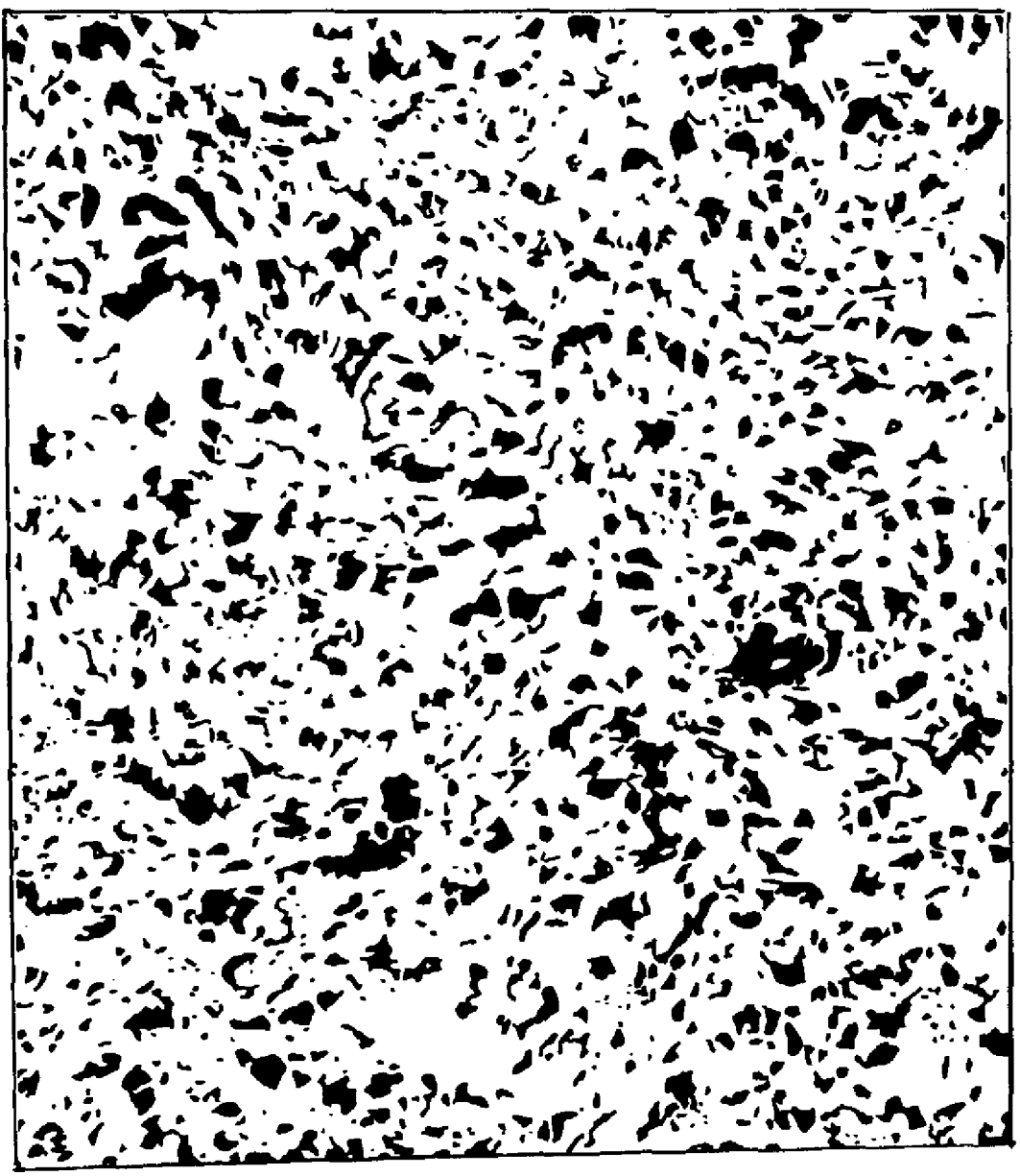

A mixture of 25.5 parts by weight of pulverized silica (R-972 from Nippon Aerosil Co., Ltd.) and 50.5 parts by weight of dibutyl phthalate (DBP) were mixed in a Henschel mixer, then 24.0 parts by weight of high density polyethylene (SH800 from Asahi Kasei Corp.) were further added thereto and mixed again in the Henschel mixer. The mixture was pelletized using a twin screw extruder. Pellets thus obtained were melted and mixed in a twin screw extruder (at 220° C.). The said molten material was extruded through a circular ring hole for extrusion of molten material, having an outer diameter of 1.58 mm and an inner diameter of 0.83 mm, which is present in an extrusion face of a spinneret for hollow fiber formation, mounted at extrusion exit in a head (220° C.) of extruder tip. Nitrogen gas was discharged as a hollow part forming fluid through a round hole for injection of a hollow part forming fluid, having a diameter of 0.6 mm, which is present inside the circular ring hole for extrusion of molten material, and injected into a hollow part of hollow fiber-like extrudate. The extrudate was wound up at a speed of 10 m/min. The hollow fiber-like extrudate thus obtained was immersed in methylene chloride to remove DBP in hollow fiber-like material by extraction. Next, it was immersed in ethyl alcohol and then in 20% by weight of a NaOH aqueous solution at 70° C. for 1 hr to remove by extraction silica in hollow fiber-like material, followed by washing with water and drying to obtain a porous hollow fiber membrane made of polyethylene. Various property values of the resultant membrane (open area ratio in an outer surface, pore diameter in a minimum pore diameter layer, pore diameter in an inner surface, fiber diameter, pure water flux, porosity, retention of water permeability in filtration of suspended water and ratio of surface abrasion resistance) are shown in Table 1, and electron micrographs and images after black and white binarize process are shown in FIGS. 4A-C.

Example 4

Figure 5A:
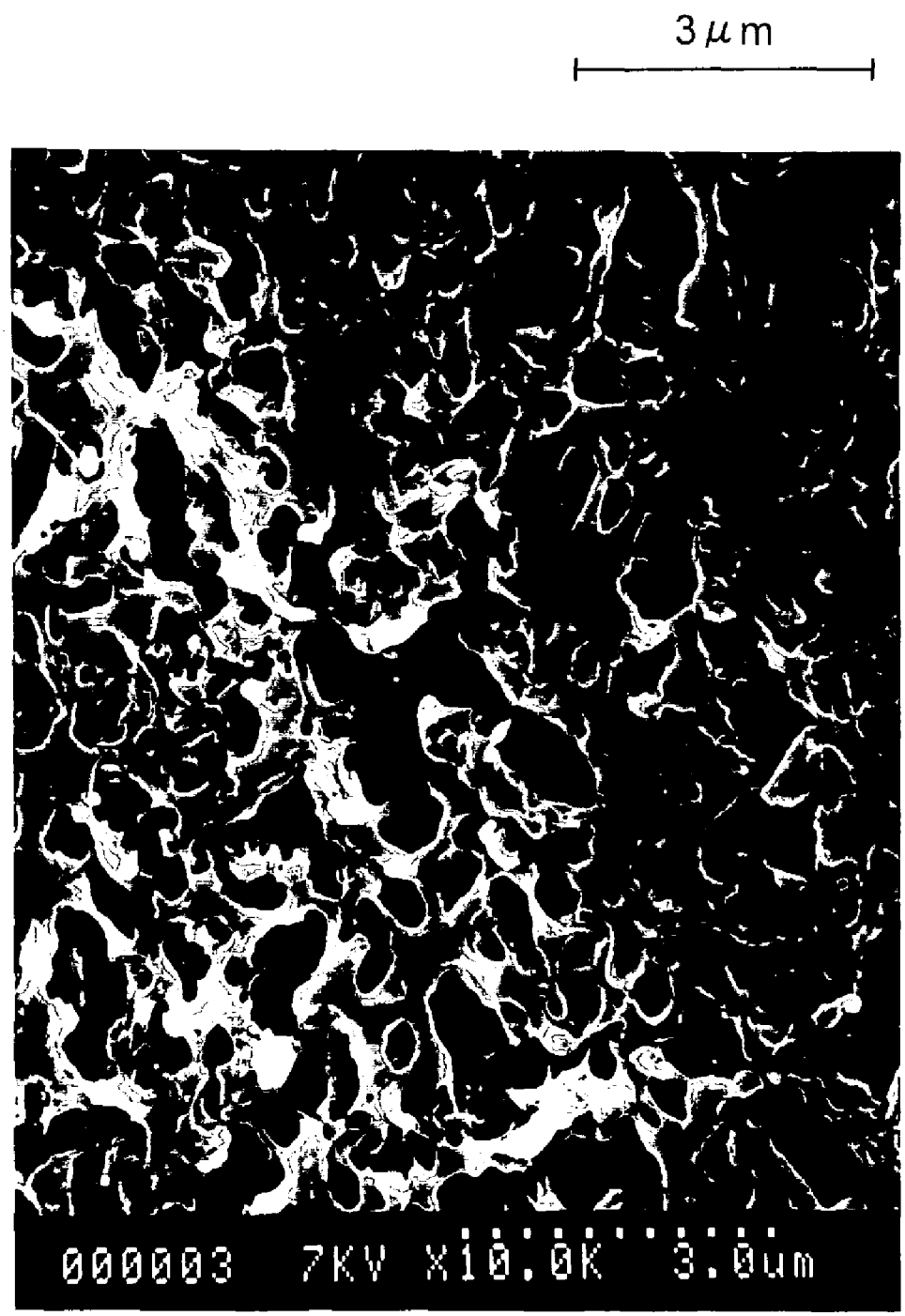
FIGS. 5A-C are electron micrographs of porous hollow fiber membrane prepared in Example 4, and their images after black and white binarize process of a part of the photographs (black part expresses a pore section and the white part expresses a non-pore section), wherein, A is a photograph of outer surface; B is a photograph of membrane cross-section (whole view); and C is a black and white binarized image of the photograph of outer surface.
Figure 5B:
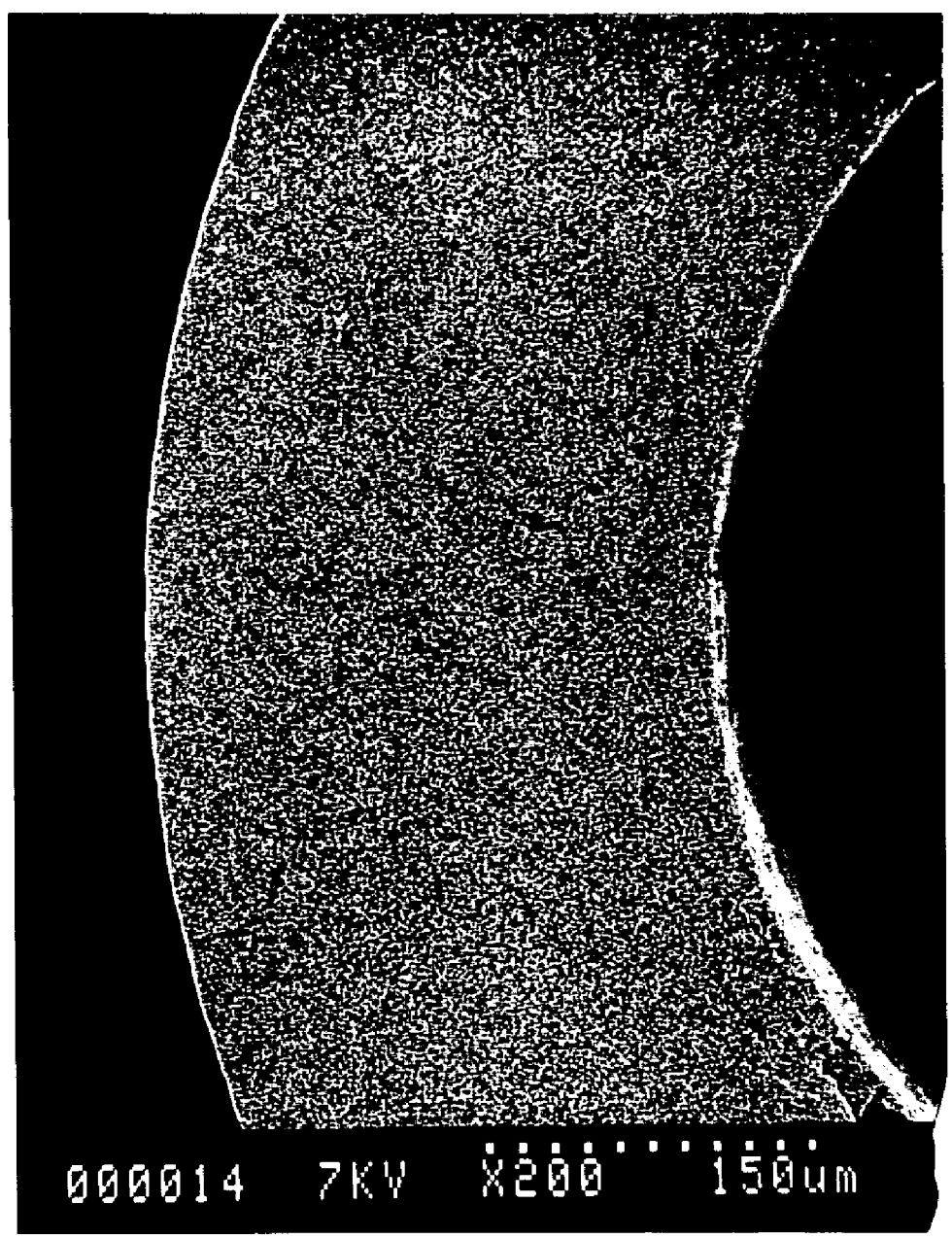
Figure 5C:
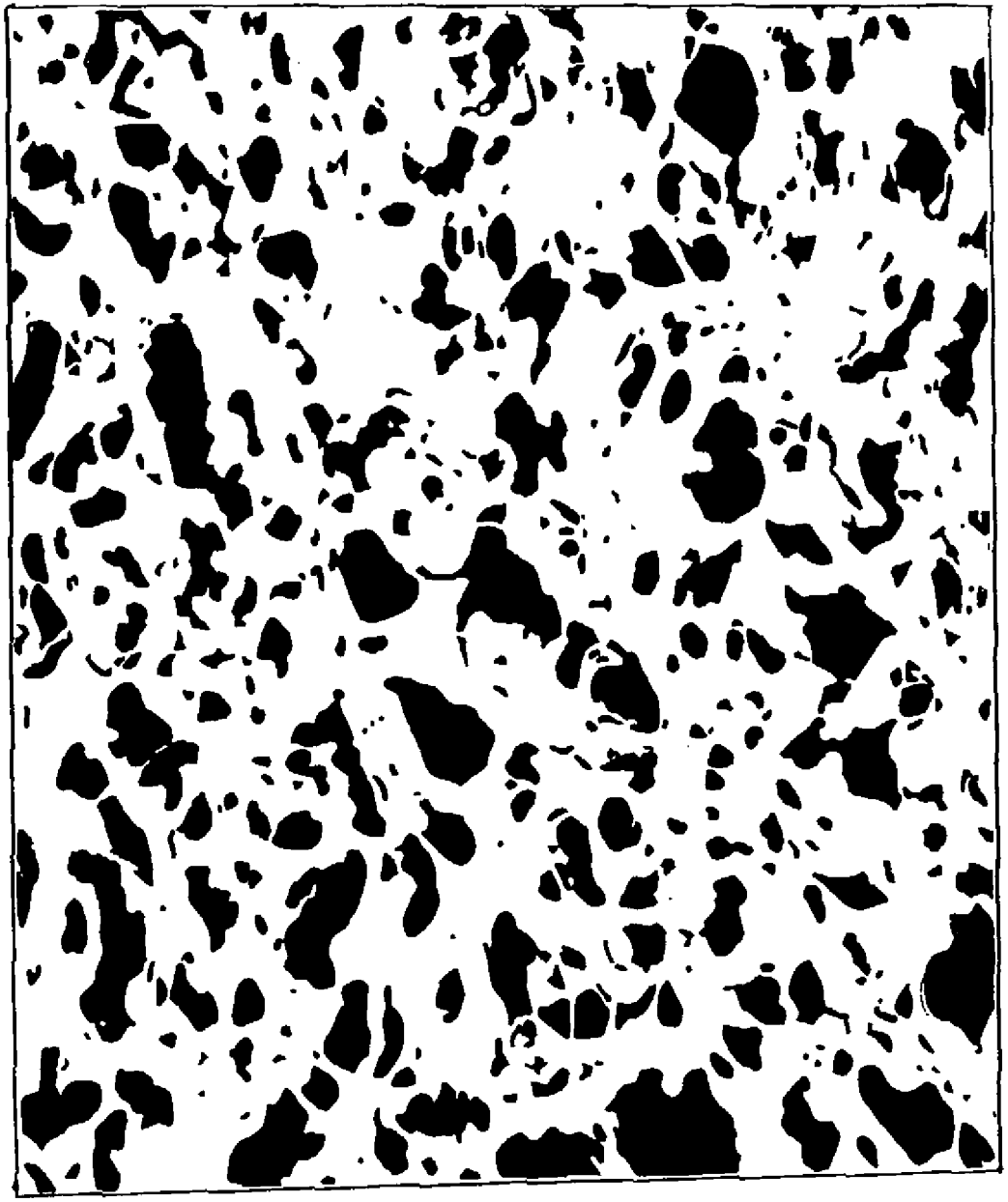
Figure 6A:
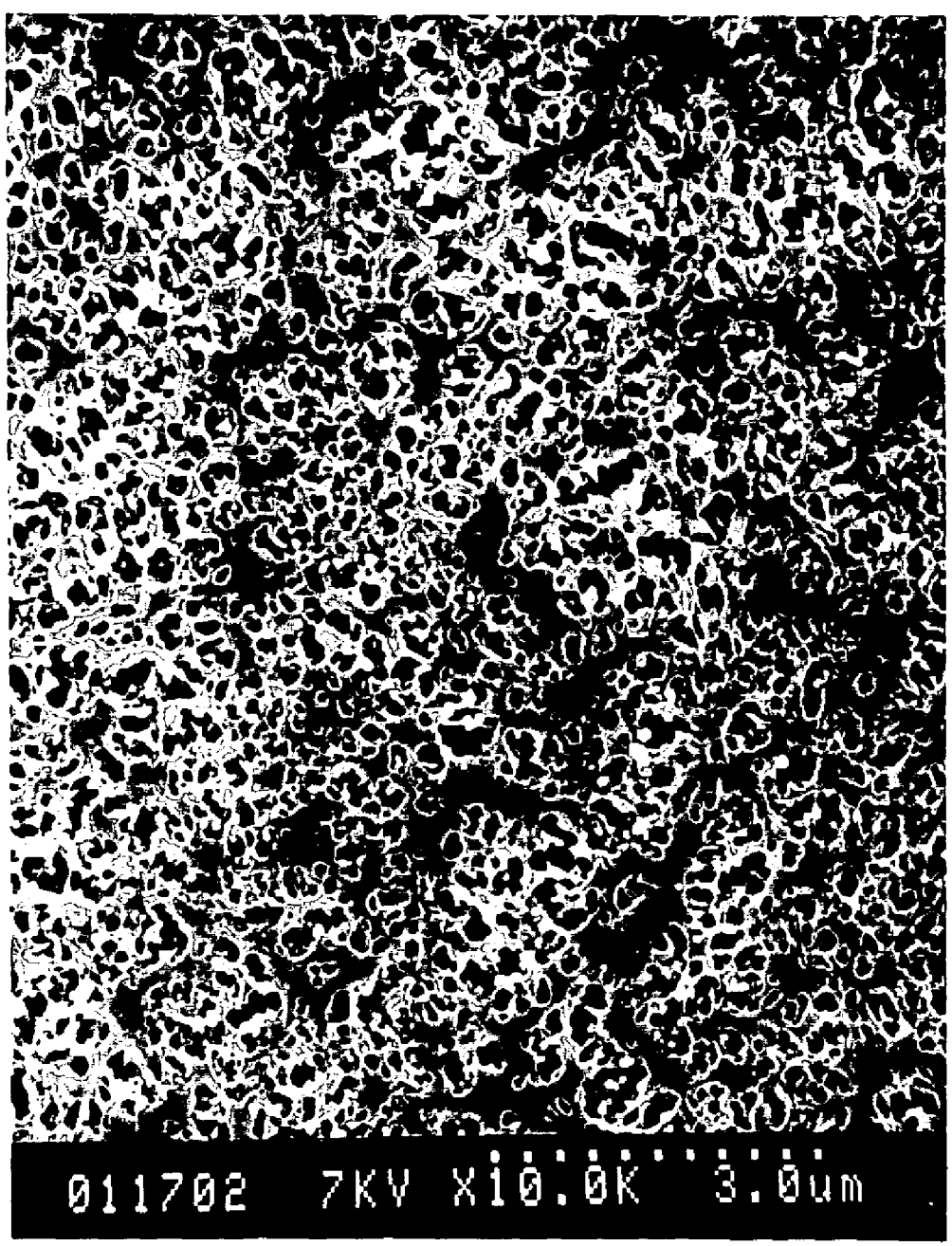
FIGS. 6A-E are electron micrographs of porous hollow fiber membrane prepared in Example 5, and their images after black and white binarize process of a part of the photographs (black part expresses a pore section and the white part expresses a non-pore section), wherein, A is a photograph of outer surface; B is a photograph of membrane cross-section (whole view); C is a photograph of membrane cross-section (magnified view); D is a photograph of inner surface; and E is a black and white binarized image of the photograph of outer surface.
Figure 6B:
Figure 6C:
Figure 6D:
Figure 6E:
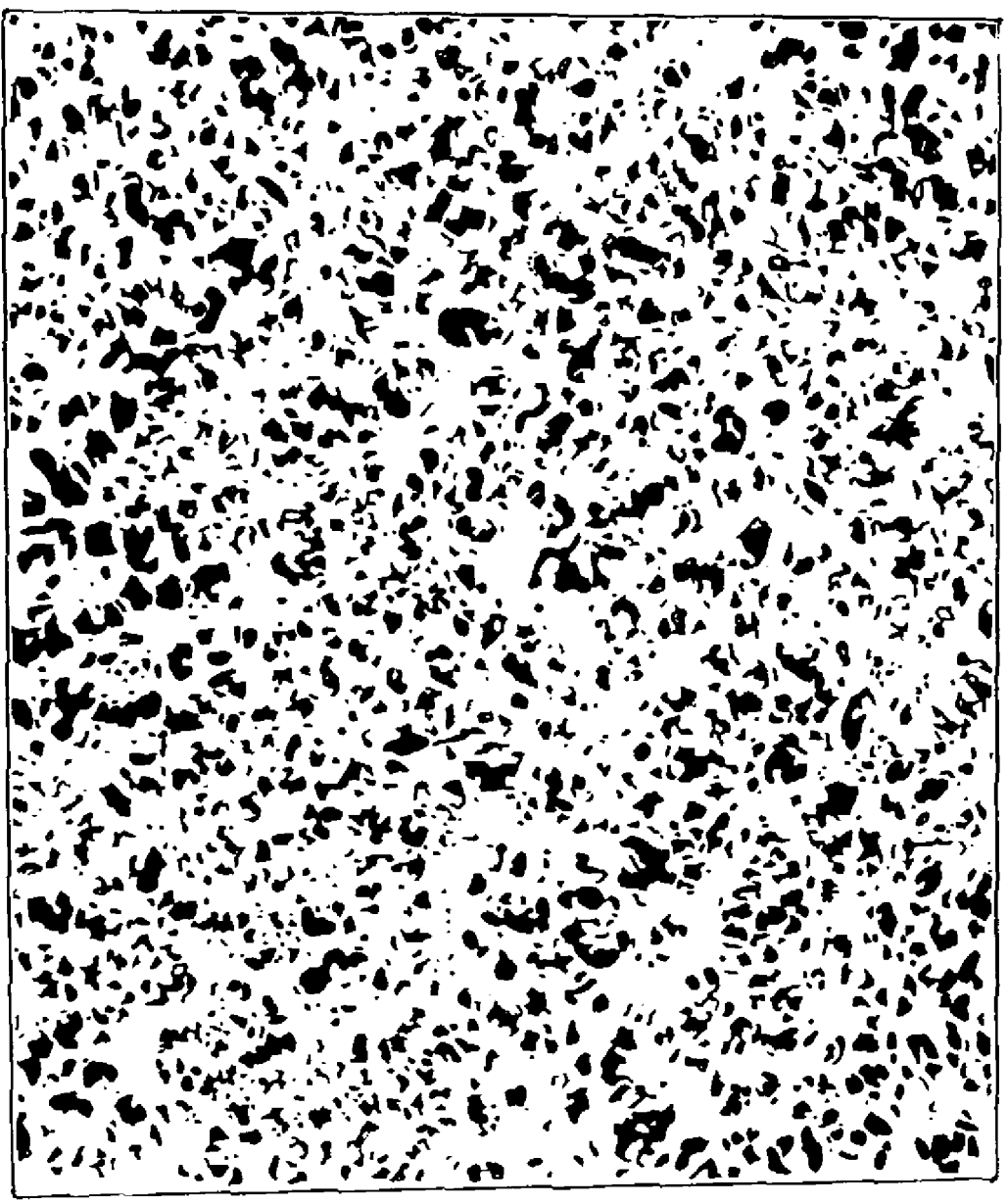

A mixture of 29 parts by weight of pulverized silica (R-972 from Nippon Aerosil Co., Ltd.) and 50 parts by weight of DBP were mixed in a Henschel mixer, then 21 parts by weight of high density polyethylene (SH800 from Asahi Kasei Corp.) were further added thereto and mixed again in a Henschel mixer. The mixture was pelletized using a twin screw extruder. Pellets thus obtained were melted and mixed in a twin screw extruder (at 200° C.). The said molten material was extruded through a circular ring hole for extrusion of molten material, having an outer diameter of 1.4 mm and an inner diameter of 0.7 mm, which is present in an extrusion face of a spinneret for hollow fiber formation, mounted at extrusion exit in a head (200° C.) of extruder tip. Nitrogen gas was discharged as a hollow part forming fluid through a round hole for injection of a hollow part forming fluid, which is present inside the circular ring hole for extrusion of molten material, and injected into a hollow part of hollow fiber-like extrudate. The extrudate was wound up at a speed of 10 m/min. The hollow fiber-like extrudate thus obtained was immersed in methylene chloride to remove DBP in the hollow fiber-like material by extraction. Next, it was immersed in ethyl alcohol and then in 20% by weight of a NaOH aqueous solution at 70° C. for 1 hr to remove by extraction the silica in hollow fiber-like material, followed by washing with water and drying to obtain a porous hollow fiber membrane made of polyethylene. Various property values of the resultant membrane (open area ratio in an outer surface, pore diameter in a minimum pore diameter layer, pore diameter in an inner surface, fiber diameter, pure water flux, porosity, retention of water permeability in filtration of suspended water and ratio of surface abrasion resistance) are shown in Table 1, and electron micrographs and images after black and white binarize process are shown in FIGS. 5A-C.

Example 5

A mixture of 23.1 parts by weight of pulverized silica (R-972 from Nippon Aerosil Co., Ltd.), 30.7 parts by weight of DOP and 6.2 parts by weight of DBP were mixed in a Henschel mixer, then 40 parts by weight of polyvinylidenefluoride (KF#1000 from Kureha Chem. Ind. Co., Ltd.) were further added thereto and mixed again in the Henschel mixer. This mixture was pelletized using a twin screw extruder. Pellets thus obtained were melted and mixed in a twin screw extruder (at 250°). The said molten material was extruded through a circular ring hole for extrusion of molten material, having an outer diameter of 1.7 mm and an inner diameter of 0.9 mm, which is present in an extrusion face of a spinneret for hollow fiber formation, mounted at extrusion exit in a head (240° C.) of extruder tip. Nitrogen gas was discharged as a hollow part forming fluid through a round hole for injection of a hollow part forming fluid, having 0.6 mm diameter, which is present inside the circular ring hole for extrusion of molten material, and injected into a hollow part of hollow fiber-like extrudate. The extrudate was, via an aerial running a distance of 30 cm, introduced into a water bath (40° C.), ran therein for a distance of about 3 m, and then was wound up at a speed of 10 m/min. The hollow fiber-like extrudate thus obtained was immersed in methylene chloride to remove DOP and DBP in the hollow fiber-like material by extraction, and dried. Next, it was immersed in ethyl alcohol and then in 20% by weight of a NaOH aqueous solution at 70° C. for 1 hr to remove by extraction the silica in the hollow fiber-like material, followed by washing with water and drying to obtain a porous hollow fiber membrane made of polyvinylidenefluoride. Various property values of the resultant membrane (open area ratio in outer surface, pore diameter in a minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 6A-E.

Comparative Example 1

Figure 7A:
FIGS. 7A-C are electron micrographs of porous hollow fiber membrane prepared in Comparative Example 1, and their images after black and white binarize process of a part of the photographs (black part expresses a pore section and the white part expresses a non-pore section), wherein, A is a photograph of outer surface; B is a photograph of membrane cross-section (whole view); and C is a black and white binarized image of the photograph of outer surface.
Figure 7B:
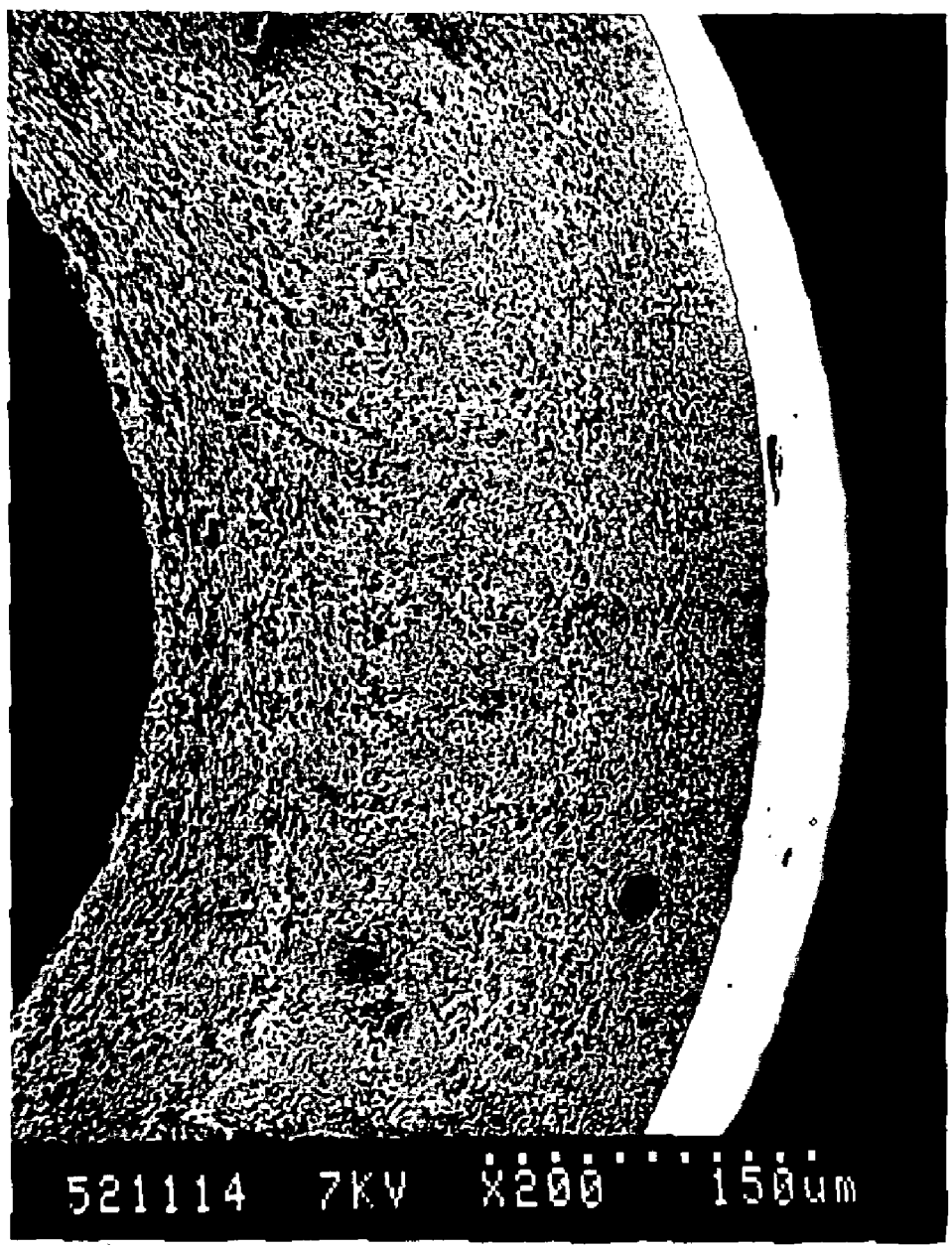
Figure 7C:
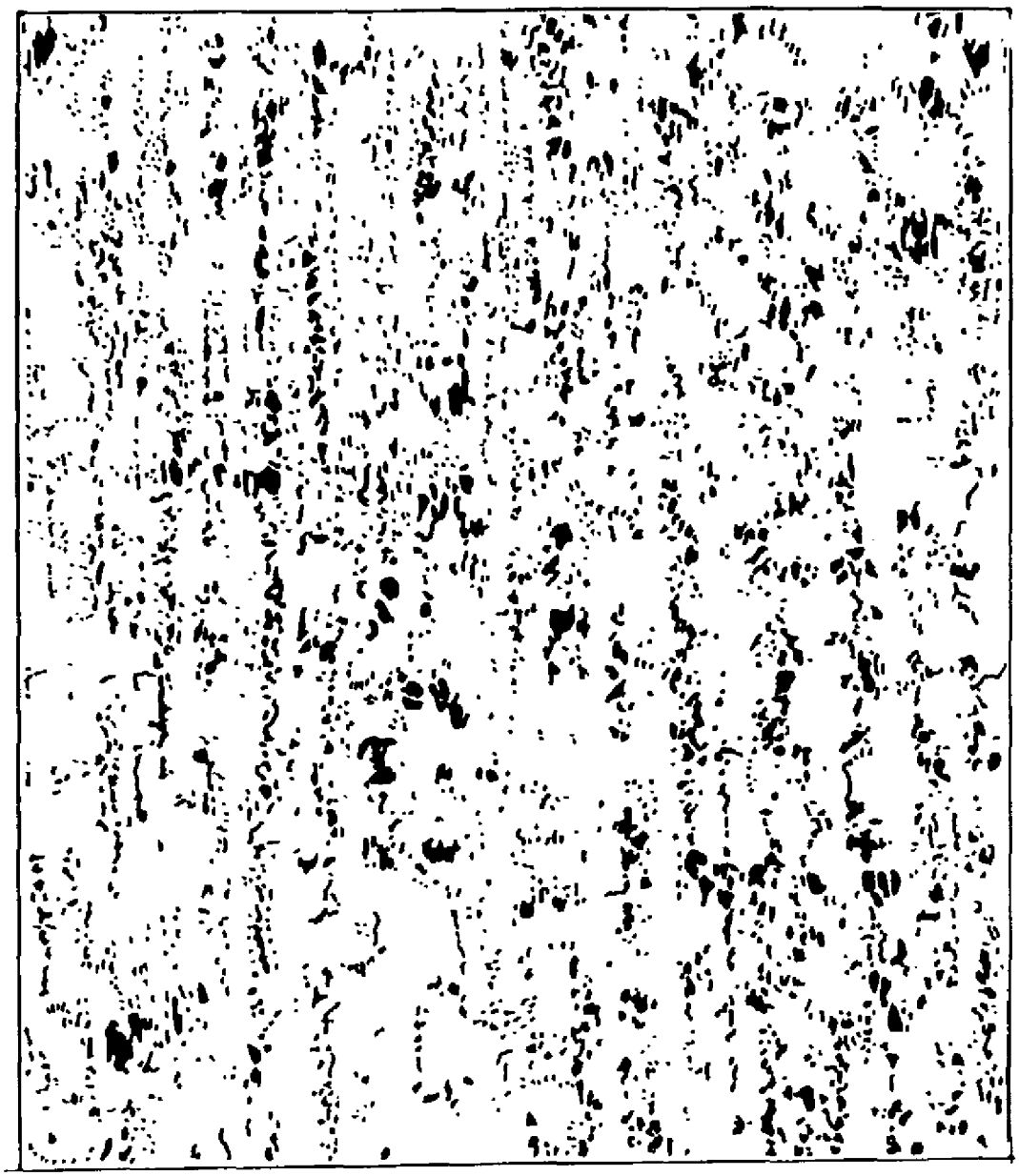

A porous hollow fiber membrane made of polyethylene was obtained as in Example 2 except that the drawing procedure was not carried out. Various property values of the resultant membrane (open area ratio in an outer surface, pore diameter in a minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 7A-C.

Comparative Example 2

Figure 8A:
FIGS. 8A-C are electron micrographs of porous hollow fiber membrane prepared in Comparative Example 2, and their images after black and white binarize process of a part of the photographs (black part expresses a pore section and the white part expresses a non-pore section), wherein, A is a photograph of outer surface; B is a photograph of membrane cross-section (whole view); and C is a black and white binarized image of the photograph of outer surface.
Figure 8B:
Figure 8C:
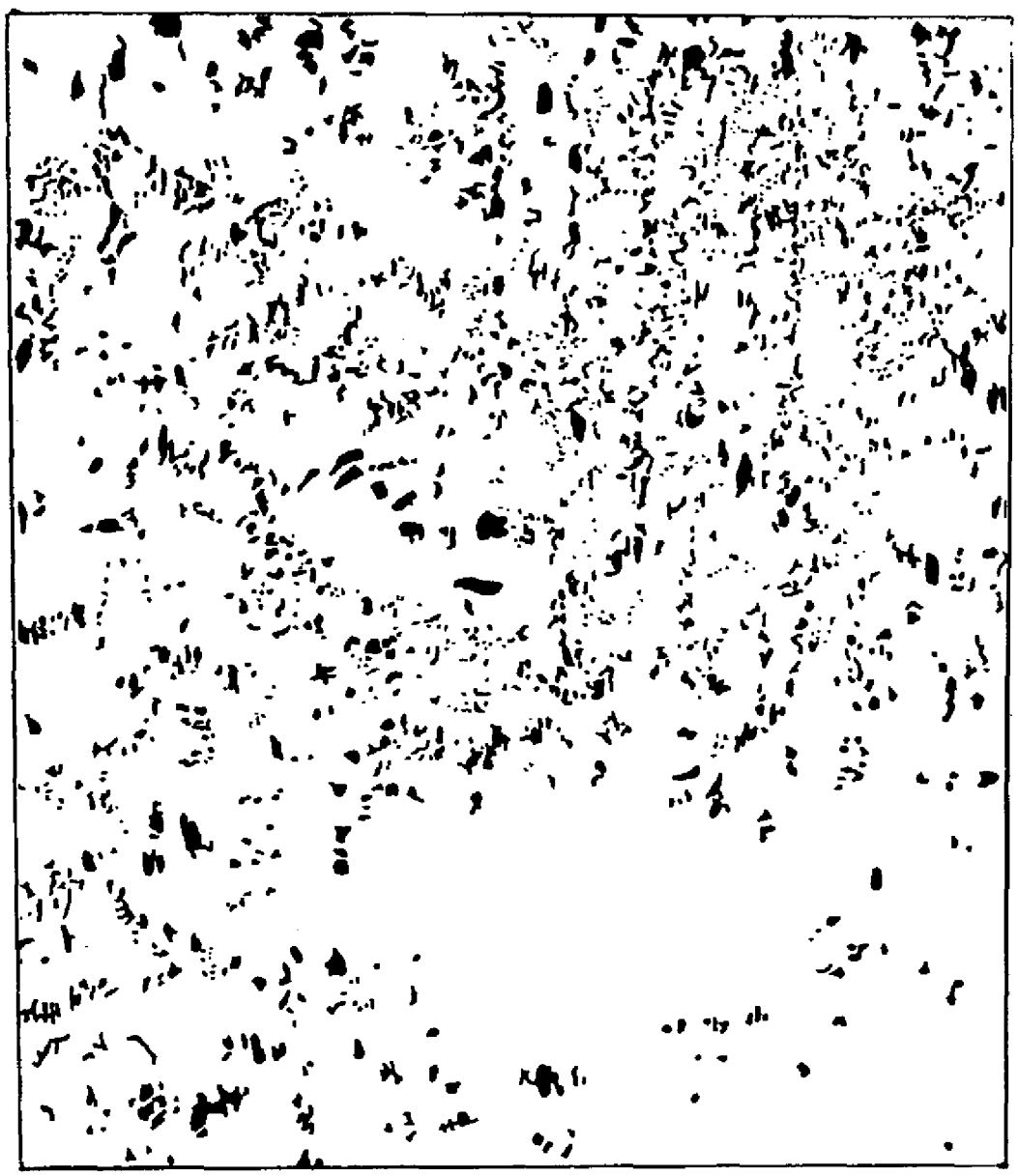

A porous hollow fiber membrane made of polyethylene was obtained as in Comparative Example 1 except that the aerial running distance was set to be 1.5 cm and temperature of water bath was set at 40° C. Various property values of the resultant membrane (open area ratio in an outer surface, pore diameter in a minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 8A-C.

Comparative Example 3

Figure 9A:
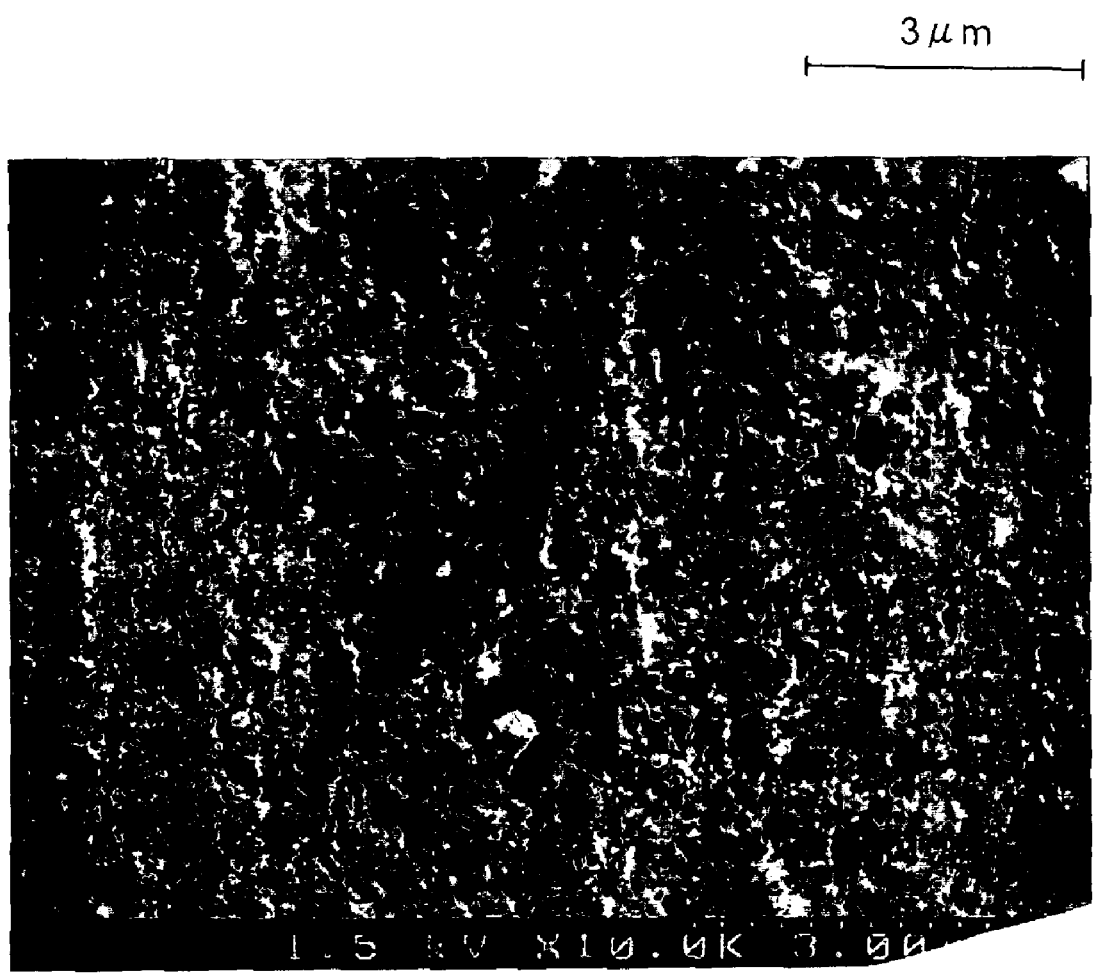
FIGS. 9A-B are electron micrographs of porous hollow fiber membrane prepared in Comparative Example 3, and their images after black and white binarize process of a part of the photographs (black part shows a pore section and the white part shows a non-pore section), wherein, A is a photograph of outer surface; and B is a black and white binarized image of the photograph of outer surface.
Figure 9B:
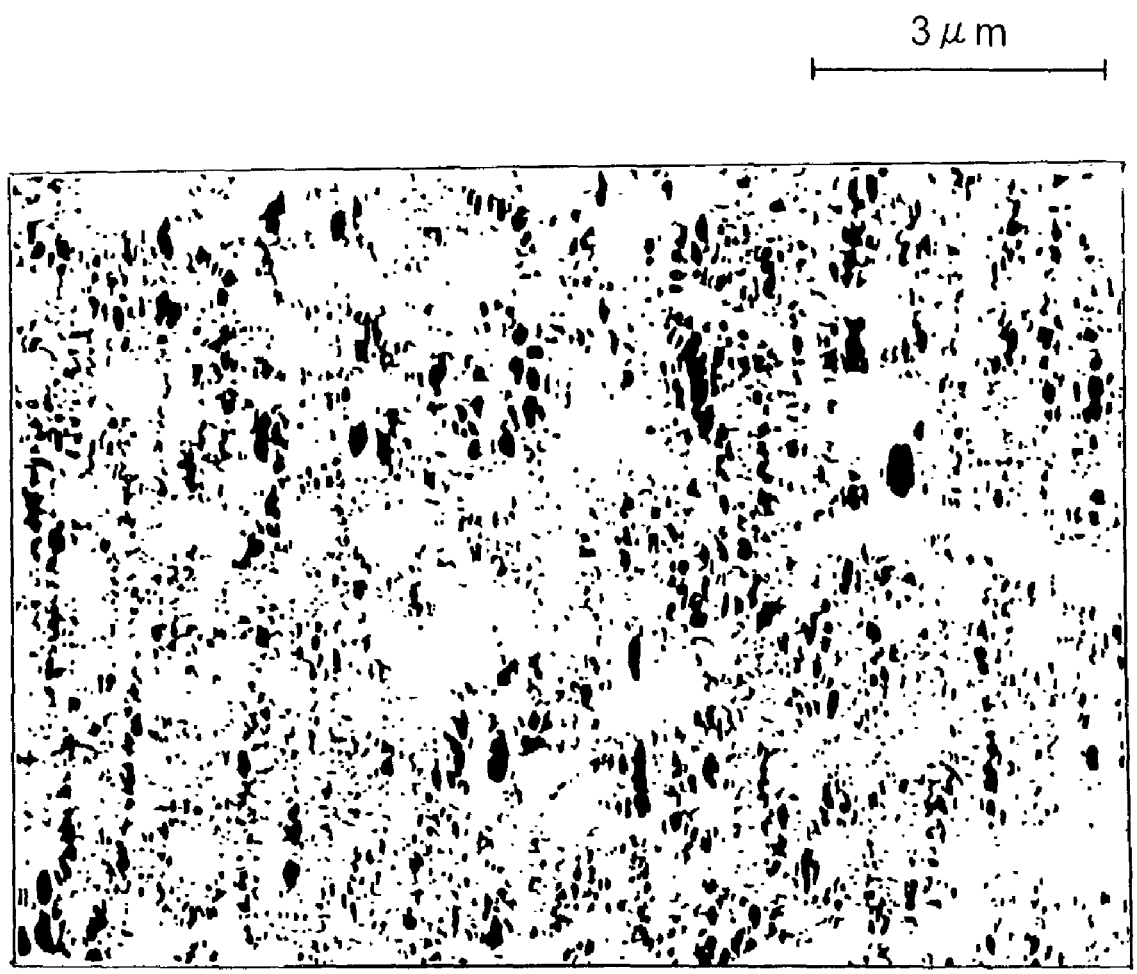

A porous hollow fiber membrane made of polyethylene was obtained as in Example 2 except that amount of polyethylene was 24 parts by weight, amount of DIDP was 76 parts by weight and temperature of water bath was set at 40° C. Various property values of the resultant membrane (open area ratio in an outer surface, pore diameter in a minimum pore diameter layer, pore diameter in an inner surface, fiber diameter, pure water flux, porosity, retention of water permeability in filtration of suspended water) are shown in Table 1, and electron micrographs and their images after black and white binarize process are shown in FIGS. 9A-B.

Comparative Example 4

A porous hollow fiber membrane made of polyethylene was obtained as in Example 4 except that a composition of pellet was 28 parts by weight of SH800, 24 parts by weight of R-972 and 48 parts by weight of DOP. Various property values of the resultant membrane (open area ratio in outer surface, pore diameter in minimum pore diameter layer, pore diameter in inner surface, fiber diameter, pure water flux, porosity, retention of water permeability in filtration of suspended water and ratio of surface abrasion resistance) are shown in Table 1.

INDUSTRIAL APPLICABILITY

A method for clarification by membrane filtration in accordance with the present invention is applicable to treatment of clear water to obtain drinking water or industrial water or treatment of sewage water to obtain regenerated water for miscellaneous use.

TABLE 1

| | Open area ratio in outer surface [%] | Pore diameter in min.pore diameter layer [μm] | Pore diameter in inner surface [μm] | Outer diameter /Inner diameter [mm] | Pure water flux [L/m²/h] | Porosity [%] | Retention of water peameability in filtration of suspended water [%] | Ratio of resistance to membrane surface abrasion [%] |
|---|---|---|---|---|---|---|---|---|
| Example 1 | 25 | 0.33 | 1.51 | 1.34/0.71 | 2200 | 70 | 90 | — |
| Example 2 | 22 | 0.30 | 1.65 | 1.21/0.67 | 4000 | 75 | 56 | — |
| Example 3 | 20 | 0.17 | 0.62 | 1.21/0.69 | 800 | 67 | 60 | 15 |
| Example 4 | 27 | 0.20 | 0.70 | 1.22/0.68 | 1100 | 65 | 83 | 44 |
| Example 5 | 23 | 0.20 | 0.56 | 1.25/0.67 | 1050 | 65 | 65 | — |
| Comparative Example 1 | 12 | 0.20 | 1.45 | 1.28/0.70 | 1100 | 70 | 25 | — |
| Comparative Example 2 | 11 | 0.38 | 1.60 | 1.41/0.79 | 1700 | 70 | 30 | — |
| Comparative Example 3 | 15 | 0.32 | 1.58 | 1.21/0.66 | 2700 | 73 | 32 | — |
| Comparative Example 4 | 15 | 0.15 | 0.45 | 1.23/0.68 | 440 | 60 | — | 5 |

The invention claimed is:

1. A porous hollow fiber membrane comprising a polyolefin, a copolymer of olefin and halogenated olefin, halogenated polyolefin or a mixture thereof and having an open area ratio in an outer surface of not less than 22%, an average pore diameter in a minimum pore diameter layer of not smaller than 0.1 μm and not larger than 0.4 μm and an average pore diameter in an inner surface being not smaller than 0.8 μm.

2. The porous hollow fiber membrane in accordance with claim 1, wherein said open area ratio in an outer surface is not less than 25%.

3. The porous hollow fiber membrane in accordance with claim 1 or 2, wherein the porous hollow fiber membrane has an inner diameter of not smaller than 0.5 mm and not larger than 3 mm and a thickness of not thinner than 0.1 mm and not thicker than 1 mm.

4. A porous hollow fiber membrane comprising a polyolefin, a copolymer of olefin and halogenated olefin, halogenated polyolefin or a mixture thereof and having an open area ratio in an outer surface of not less than 22%, an average pore diameter determined by ASTM-F 316-86 of not smaller than 0.1 μm and not larger than 0.4 μm and an average pore diameter in an inner surface being not smaller than 0.8 μm.

5. A method for membrane filtration purification of suspended water, comprising filtering the suspended water under an external pressure through a porous hollow fiber membrane comprising a polyolefin, a copolymer of olefin and halogenated olefin, halogenated polyolefin or a mixture thereof and having an open area ratio in an outer surface of not less than 22%, an average pore diameter in a minimum pore diameter layer of not smaller than 0.1 μm and not larger than 0.4 μm and an average pore diameter in an inner surface being not smaller than 0.8 μm.

\* \* \* \* \*